United States Patent

Mody et al.

[11] Patent Number: 5,925,598
[45] Date of Patent: *Jul. 20, 1999

[54] WATER-BASED DRILLING FLUID FOR USE IN SHALE FORMATIONS

[75] Inventors: Fersheed K. Mody; James V. Fisk, Jr., both of Houston, Tex.

[73] Assignee: Bairod Technology, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,521

[22] Filed: Nov. 1, 1996

Related U.S. Application Data

[63] Continuation of application No. 08/490,782, Jul. 17, 1995, abandoned, which is a continuation-in-part of application No. 08/286,042, Aug. 4, 1994, abandoned.

[51] Int. Cl.⁶ ...................................................... C09K 7/02
[52] U.S. Cl. .......................... 507/140; 507/141; 507/145; 166/250.02; 166/282
[58] Field of Search .................................... 507/140, 141, 507/145; 166/250.02, 282

[56] References Cited

U.S. PATENT DOCUMENTS

| | | | |
|---|---|---|---|
| 3,628,615 | 12/1971 | Chenevert . | |
| 3,679,001 | 7/1972 | Hill | 507/145 |
| 3,746,109 | 7/1973 | Darley | 507/145 |
| 3,850,817 | 11/1974 | Barthel | 507/145 |
| 3,878,110 | 4/1975 | Miller et al. | 507/145 |
| 4,240,924 | 12/1980 | Block | 507/145 |
| 4,526,693 | 7/1985 | Son et al. | 507/145 |
| 4,741,843 | 5/1988 | Garvey et al. . | |
| 5,134,118 | 7/1992 | Patel et al. | 507/140 |
| 5,211,250 | 5/1993 | Kubena, Jr. et al. | 507/140 |

OTHER PUBLICATIONS

"A Borehole Stability Model to Couple the Mechanics and Chemistry of Drilling Fluid Shale Interaction", SPE/IADC 25728 By: F.K. Mody & A.J. Hale, pp. 473–490.

"Detailed Analysis of Rock Failure in Laboratory Compression Tests", (1968) By: W.R. Wawerski, Ph.D. Thesis, Univ. Minnesota, pp. 2916–B and 2917–B.

"Critical Parameters in Modeling the Chemical Aspects of Borehole Stability in Shales and in Designing Improved Water–Based Shale Drilling Formations", SPE 28309, By: E. van Oort, A.H. Hale, F.K. Mody, pp. 171–186 (1994).

"Experimental Investigation of the Influence of Chemical Potential on Wellbore Stability", IADC/SPE 23885 By: A.H. Hale, F.K. Mody & D.F. Salisbury, pp. 377–389 (1992).

"Borehole Stability in Shales", SPE 24975, *SPE Drilling & Completion*, Jun. 1994 By: G.M. Bol, S.W. Wong, C.J. Davidson & D.C. Woodland, pp. 87–94.

"Quantitative Determination of the Mechanical Properties of Shales", SPE 18024 By: R.P. Steiger & P.K. Leung, pp. 69–76, (1988).

"Drilling Fluid Induced Borehole Instability in Shales", SPE/ISRM 28064 By: E. van Oort, pp. 291–309 (1994).

(List continued on next page.)

*Primary Examiner*—Philip Tucker
*Attorney, Agent, or Firm*—Karen B. Tripp

[57] ABSTRACT

A water-based drilling fluid for use in shale formations having a given average pore size has solutes dissolved therein sized so as to allow the pores of the shale formations to at least partially restrict the solutes. For purposes of enhancing the restriction of the solutes by the shale pores, the dissolved solutes may have different radii. Additional solutes, preferably lower molecular weight salts, are dissolved in the drilling fluid to lower the activity of the water in the water-based drilling fluid.

The same combination of additives, a first additive of dissolved molecular solutes sized to at least partially block a shale pore space and a second additive of dissolved molecular solutes selected to lower the water activity, are combined in a water-based carrier fluid and used in earth boreholes surrounded by shale formations as either a spotting fluid, or as a lubricant, or as a shale formation strengthener or as a completion fluid.

14 Claims, 11 Drawing Sheets

G. 1

OTHER PUBLICATIONS

"Borehole Stability in Shales: A Constitutive Model for the Mechanical and Chemical Effects of Drilling Fluid Invasion", SPE/ISRM 28059 By: S.W. Wong & W.K. Heidug, 8 pp., (1994).

"Biot Poroelasticity of a Chemically Active Shale", *Proc. R. Soc. Lond.* (1993) pp. 365–377, By: J.D. Sherwood.

"Environmentally Acceptable Water–Based Mud Can Prevent Shale Hydration and Maintain Borehole Stability", IADC/SPE Drilling Conference, Dallas, TX (1994) By: J.P. Simpson, T.O. Walker & G.Z. Jiang, IADC/SPE 27496, 13 pp.

"The Influence of Moisture Content on the Compressive Strength of Rocks" *Proc. Rock Mech. Symp.*, pp. 65–83 (1965), By: P.S.B. Colback & B.L. Wild.

"Temperature and Humidity Affect Strength of Rock Structures at White Pine", *Society of Mining Engineers, AIME*, vol. 247 pp. 142–143, 146–149, (1970), By: J. Parker.

"The Influence of Moisture on the Pre–Rupture Fracturing of Two Rock Types" vol. 2, pp. 239–245, 2nd Int. Conf. Rock Mech. (1970), By: B.L. Wild.

"The Phenomena of Rupture and Flow in Solids", *Royal Society of London*, Series A, vol. 221, pp. 163–198, By: A.A. Griffith (1920).

"Crack Growth and Faulting in Cylindrical Specimens of Chelmsford Granite", *Int. J. Rock Mech. Min. Sci.*, vol. 9, pp. 37–86 (1970) By: S. Peng and A.M. Johnson.

"A Test of the Law of Effective Stress for Crystalline Rocks of Low Porosity", *Int. J. Rock Mech. Min. Sci.*, vol. 5, pp. 415–426 (1968) By: W.F. Brace and R.J. Martin III.

"Strain Rate Effects in Kimmeridge Bay Shale", *Int. J. Rock Mech. Min. Sci. & Geomech. Abstr.*, vol. 26, pp. 135–149 (1989) By: G. Swan, J. Cook, S. Bruce & R. Meehan.

"Effects of Strain Rate and Confining Pressure on the Deformation and Failure of Shale", IADC/SPE 19944 By: J.M. Cook, M.C. Sheppard & O.H. Houwen, pp. 291–296.

"The Effects of Cracks on the Uniaxial Elastic Compression of Rocks", *Journal of Geophysical Research*, vol. 70, No. 2 (1965), pp. 399–411 by J.B. Walsh.

"Swelling of Mudstone Due to Sucking of Water", Proceedings of the First Congress of the International Society of Rock Mechanics, (1966) 5 pp. By: Sakuro Murayama, Norio Yagi.

"Adsorptive Pore Pressures of Argillaceous Rocks", *Rock Mechanics Theory and Practice* (W.H. Somerton, Ed.), pp. 599–627 (1970) By: M.E. Chenevert.

"Force Fields and Chemical Equilibrium in Heterogeneous Systems with Special Reference to Soils", *Soil Science*, vol. 71, pp. 409–418 (1953) By: P.F. Low.

"Effects of Ions on the Self–Diffusion and Structure of Water in Aqueous Electrolytic Solutions", *J. Phys. Chem*, vol. 58, pp. 686–692 (1954) By: J.H. Wang.

"Self–Diffusion and Structure of Liquid Water. III. Measurement of the Self–Diffusion of Liquid Water with $H^2$, $H^3$ and $O^{18}$ as Tracers", *J. Am. Chem. Soc.*, vol. 75, pp. 466–470 (1952), By: J.H. Wang, C.V. Robinson & I.S. Edelman.

"Movement of Water as Effected by Free Energy and Pressure Gradients: I. Application of Classical Equations for Viscous and Diffusive Movements to the Liquid Phase in Finely Porous Media", *Soil Science Society of America Proceedings*, vol. 25, pp. 255–260 (1961), By: W.D. Kemper.

"Movement of Water as Effected by Free Energy and Pressure Gradients: II. Experimental Analysis of Porous Systems in Which Free Energy and Pressure Gradients Act in Opposite Directions", *Soil Science Society of America Proceedings*, vol. 25, pp. 260–265 (1961), By: W.D. Kemper.

"Movement of Water as Effected by Free Energy and Pressure Gradients III. Restriction of Solutes by Membranes", *Soil Science Society of America*, vol. 27, pp. 485–490 (1963), By: W.D. Kemper and N.A. Evans.

"Osmotic Flow of Water Across Permeable Cellulose Membranes", *The Journal of General Physiology*, vol. 44, pp. 315–326 (1960) By: R.P. Durbin.

Reduced Environmental Impact and Improved Drilling Performance with Water–Based Muds Containing Glycols, SPE 25989 (1993) By: P.I. Reid, G.P. Elliot, R.C. Milton, B.D. Chambers & D.A. Burt.

"TAME: A New Concept in Water–Based Drilling Fluids for Shales", SPE 26699 (1993) By: J.D. Downs, E. van Oort, D.I. Redman, D. Ripley & B. Rothmann.

E. van Oort, A. H. Hale, and F.K. Mody: "Manipulation of Coupled Osmotic Flows for Stabilisation of Shales Exposed to Water–Based Drilling Fluids." SPE 30499, Society of Petroleum Engineers, 1995.

Philip F. Low: "Force Fields and Chemical Equilibrium in Heterogeneous Systems with Special Reference to Soils." *Soil Science*, vol. 71, pp. 409–418, 1951.

Marcel Mulder: "Polarisation Phenomena and Membrane Fouling." In *Basic Principles of Membrane Technology*, Chapter VII, pp. 281–311. Dordrecht: Kluwer Academic Publishers, 1991.

Staverman, A.J.: "The Theory of Measurement of Osmotic Pressures." *Recueil des Travaux Chimiques des Pays–Bas*, vol. 70, pp. 344–352, 1951.

WATER-BASED DRILLING FLUID FOR USE IN SHALE FORMATIONS

RELATED APPLICATION

This is a continuation of U.S. application Ser. No. 08/490,782, filed on Jul. 17, 1995, now abandoned which is a continuation-in-part of U.S. application Ser. No. 08/286,042, filed Aug. 4, 1994, now abandoned.

BACKGROUND OF THE INVENTION

Approximately one-third to two-thirds the cost of a barrel of oil is spent in drilling. This represents $200 million per day for world production of 60 million barrels per day, at $10/bbl production cost. The time spent drilling hydrocarbon wells in rotating the drill bit at the bottom of the hole (i.e., actually cutting the rock) increases from about 25% for shallow wells to almost 50% as the well depth increases to 15,000 feet, with an overall average of 34%. Of the total footage drilled, 75% is in shales. These figures imply, in the most conservative case, that world expenditures while drilling shales are in excess of $20 million per day. Drilling through shales also causes over 90% of wellbore stability problems. The drilling of shales can result in a variety of problems from washout to complete collapse of the hole. More typically, drilling problems in shales are bit balling, sloughing, or creep. The problem is severe; it as been estimated to be a $500 million/year problem[1-5].

The engineering problems of instability in shales are closely connected with the bulk properties of shales such as strength and deformation which are a function of depositional environment, porosity, water content, clay content, composition, compaction history, etc. The bulk properties of the drilling fluid such as the chemical makeup and concentration of the continuous phase of the mud, the composition and type of an internal phase if present, the additives associated with the continuous phase, and the maintenance of the system are also of engineering importance. Other factors such as in situ stresses, pore pressure, temperature, time in open hole, depth and length of the open hole interval, surrounding geological environment (salt dome, tectonics, etc.), also directly impact drilling and completion operations. For a successful drilling operation these parameters must be integrated into well planning, mud system selection criteria, and/or new mud development. These variables are interconnected and influence the overall (in)stability in shales while drilling.

As oil reserves deplete and the cost of drilling increases, the need to drill extended-reach wells with long open hole intervals will also increase. In the past, oilbased muds (OBM) have been the workhorse of the industry for difficult drilling. Their application has been typically justified on the basis of borehole stability, fluid loss, filtercake quality, lubricity, and temperature stability. As the environmental concerns restrict the use of oil-based muds, the industry must provide innovative means to obtain OBM performance without negatively impacting the environment. The successful introduction and application of ester-based biodegradable invert emulsion drilling fluids in the past decade have provided attractive alternatives to traditional OBM in accessing hydrocarbon reserves located in environmentally sensitive regions. The costs associated with the use of these biodegradable invert emulsion drilling fluid systems limit the application of such systems on a routine basis. Water-based muds (WBM) are attractive replacements from a direct cost point-of-view. But, conventional WBM systems have failed to meet key performance criteria obtained with OBM in terms of rate of penetration (ROP), bit and stabilizer balling, lubricity, filtercake quality and thermal stability. More importantly, severe borehole (in)stability problems are encountered when drilling shale formations with conventional WBM, leading to significant increases in the overall well cost.

Past efforts to develop improved WBM for shale drilling have been hampered by a limited understanding of the drilling fluid/shale interaction phenomenon. This limited understanding has resulted in drilling fluids designed with non-optimum properties required to prevent the onset of borehole instability. Historically, problems have been approached on a trial-and-error basis, going through a costly multiwell learning curve before arriving at reasonable solutions for optimized operations and systems. Recent studies[1-4,6,9] of fluid-shale interactions, however, have produced fresh insights into the underlying causes of borehole (in) stability, leading to the design of water-based, shale drilling fluids in accord with the present invention.

The following analysis summarizes the complex phenomenon of the physcochemical interaction between drilling fluids and shale, and provides strategies to apply this understanding to the design of WBM to combat borehole instability problems in shales. A theoretical framework based on fundamental thermodynamic principles conceptualizes the relationship between different driving forces (hydraulic and chemical potential) and critical drilling fluid/shale system parameters.

PROBLEM BACKGROUND AND DISCUSSION

In many cases, borehole instability arises from insufficient mud pressure support on the borehole wall from an inadequate mud weight or a time-dependent increase in near-wellbore pore pressure. This results in higher water contents in the near wellbore region which can be translated into lower shale strengths[2,3]. The movement of the water (fluid) in or out of the shale is governed by several mechanisms[1,2]; the two most relevant are the hydraulic pressure difference ($\Delta P$) between the wellbore pressure (mud weight) and the shale pore pressure, and the chemical potential differences ($\Delta u$) between the drilling fluid and the shale pore fluid. Mody et al. (1993) presented data based on the two fundamental driving forces and transport mechanisms (hydraulic and osmotic) to explain how an OBM could be effective at stabilizing the wellbore. The results were:

1. The presence of threshold capillary entry pressures between the OBM and low permeability shales was used to explain the effectiveness of OBM to provide a net compressive radial stress on the wellbore wall which promotes wellbore stability. For WBMs, the hydraulic pressure (mud weight minus pore pressure) difference is in communication. The net compressive radial stress on the borehole wall dissipates (radial stress approaches zero at hydraulic equilibrium) with time as wellbore pressure can communicate with shale pore pressure.

2. Experimental results support the contention that OBMs provide the characteristics of a semipermeable membrane required for the osmotic transport of water to or from a shale. The difference in the molar free energies of the water in the OBM and the shale provides the driving mechanism for the hydration of the shale or the extraction of water from the shale (dehydration). Results also substantiate that the change in water content from the above driving mechanism results in a change in shale strength[2,3].

The interaction process and the mechanisms of transport for WBM/shale system are quite different and more complex. The molar free energies of all of the constituents within the shale and the water-based drilling fluid provide the driving forces that result in the transfer of water, cations, anions, etc. The sum of all these forces (hydraulic, chemical potential, thermal, etc.) can result in a net flow. The equilibrium conditions will be dictated by the sum of these forces. The difficulty is in the mathematical treatment of this coupled physco-chemical interaction between the WBM and shale. The knowledge of the driving forces with the associated transport mechanisms are required in modeling this phenomenon. Several investigators have used the nonequilibrium thermodynamic approach in the treatment of the transport process in shales[1,2,7,8]. Nonequilibrium thermodynamics allow the incorporation of cross effects between different phenomenon, such as flux of a solution with different ionic species caused by the hydraulic gradients and/or chemical potential gradient of that species, as well as thermal and electrical gradients.

This complex nonequilibrium thermodynamic problem can be simplified by restricting the discussions in WBM/shale systems to the transfer of water alone and thus to an osmotic mechanism. This assumption may have limited utility, because it requires that the shale itself under in situ conditions must possess characteristics similar to that of a semipermeable membrane. The contention that shales can have characteristics resembling a semipermeable membrane under in situ conditions has not been totally resolved, because:

1. The debate over the concept of membrane ideality for WBM/shale systems as it applies to borehole (in)stability is in its infancy.

2. It is extremely difficult if not impossible to measure and quantify the in situ ideality of a WBM/shale system.

3. Laboratory experiments conducted at different research laboratories on different shale samples under different test conditions often leads to different conclusions. However, a growing body of evidence supports the contention that low permeability ($10^{-9}$ to $10^{-12}$ darcy) clay rich geological sediments (e.g., shales) subjected to in situ stresses may attain characteristics that resemble a "leaky semi-permeable membrane" (i.e., partial restriction of solute) through electrical repulsion and/or pore size restriction.

If one accepts the concept that under in situ conditions low permeability, nonfractured, clay rich shales provide a leaky semi-permeable membrane, then the relationship between hydraulic flow and flow caused by the differences in chemical potential will define the net flow of fluid for WBM/shale systems. The alteration in the near wellbore pore pressure and the effective stress state will be influenced by this fluid flow. Experimental evidence reported by Mody et al. (1993), van Oort et al. (1994), and Simpson et al. (1994) shows that the chemical potential driving force, created from the activity difference between the drilling fluid and shale, can counteract the hydraulic driving force (the difference between the mud weight and pore pressure). A theoretical relationship based on fundamental thermodynamic principles is presented hereinafter to support the experimental observations that osmotic pressure acts as a negative hydraulic pressure in its influence on water movement. The presence of this phenomenon in the WBM/shale system has great implications in the modeling of borehole (in)stability in shales. As stated earlier, one of the root causes of shale (in)stability is the time-dependent increase in near-wellbore pore pressure caused by the invasion of drilling fluid into the shale, driven by the hydraulic pressure gradient across the wellbore interface from mud to the shale pore fluid. Drilling fluids in accord with the present invention that can eliminate, counteract, or minimize the invasion of this pressure front (flow) into the shales reduce the effects that lead to borehole instability.

Conventional WBMs are not specifically designed to inhibit the flow of aqueous filtrate into shales. The progressive near-wellbore pore pressure build up with these drilling fluids can eventually induce borehole destabilization when the stress around the borehole exceeds the strength of the shale. The fluid invasion not only alters the stress state but it can also impact the near wellbore strength of the shale[1-3]. Given this scenario, the ability within the prior art to drill trouble-free holes in shales with conventional WBMs may sometimes be a matter of good luck as well as matter of good judgment. This depends particularly upon the extent to which:

1. The local lithology (shale strength) and the in situ stress magnitudes either prevent immediate rock failure or provide some form of post-failure stabilization in the failed zone.

2. One can minimize the pore-pressure penetration effects by reducing the time the open hole shale section is exposed to the drilling fluid[1-4].

3. One takes care to minimize destabilization of failed zones by reducing pressure transients in the annulus (i.e., swab/surge pressures)[4].

Improved WBMs in accord with the present invention designed specifically to alleviate borehole instability problems in shales incorporate chemistry that will minimize or even counteract the hydraulic pressure communication between the wellbore and the shale pore fluid. Drilling fluid formulation strategies to achieve this objective are presented hereinafter.

Shale (In)Stability: Key Aspects in Modeling Borehole (In)Stability

Borehole (in)stability in shales is influenced by a multitude of mechanisms. The relative impact of these mechanisms on borehole (in)stability will depend upon:

1. In situ characteristics of shale (e.g, strength, degree of compaction/cementation, porosity, permeability, pore size, geological setting, temperature etc.)

2. Type and properties of drilling fluids (e.g., OBM or WBM, mud weight, oil/water ratio, salinity, combinations of salt type, filtrate viscosity, rheological properties etc.)

3. Drilling practices (e.g., ROPs, flow rates, hole cleaning, swab/surge pressures etc.) A comprehensive borehole stability model may have to incorporate these effects for general application in the field.

Four basic drilling fluid-related shale-destabilizing mechanisms are presented by van Oort et al. (1994), and Bol et al.(1992):

1. Failure or yielding of shale in compressive/shear mode due to insufficient mud weight support.

2. Failure or yielding of shale in a compressive/shear mode due to alteration in the near wellbore stress state and strength as a result of change in near wellbore pore pressure caused by either hydraulic pressure communication and/or chemical interaction between the drilling fluid and shale.

3. Failure in the shear displacement mode when mud pressure is high enough to reopen naturally existing closed fractures that intersect the borehole.

4. Failure of the formation in the tensile mode as a result of excessive mud weight and/or through an increase in near wellbore pore pressure resulting from drilling fluid-shale interaction.

In addition, annular pressure fluctuations as an important source of instability has been previously recognized[2,4]. The operational parameters that can be controlled to combat borehole (in)stability problems are in order of importance:
1. Mud weight and mud chemistry.
2. Hole angle, azimuth etc.
3. Swab/surge pressures, etc. Through these measures, control can be gained over development of the near wellbore stresses and formation strength in time.

A major objective in the design and formulation of the drilling fluid in accord with the present invention is to minimize wellbore pressure communication into the shale formation. This can be achieved by manipulating mud weight and mud chemistry. Van Oort et al. (1994), and Hale et al. (1992) present experimental results which demonstrate how water content changes as a result of shale/fluid interaction impact the strength of the shale. Fundamental mechanisms that govern the strength alteration due to change in water content are provided in the next section to complement the observed experimental results. Mody et al. (1993) presented an analytical model that combines the mechanics and chemistry of drilling fluid/shale interaction to optimize drilling fluid parameters (mud weight and mud chemistry) for maintaining a stable borehole. Van Oort et al. (1994) provide an overview of the fundamental flows and driving forces and the way these coupled flows can be handled in a nonequilibrium thermodynamic framework. The concept of "reflection coefficient" (i.e., membrane ideality) first proposed by Staverman (1951) was intended to handle "leaky systems" (i.e., WBM/shale type systems) for borehole stability applications. Experimental procedures and laboratory-measured values of the "reflection coefficient" were presented for different WBM/shale systems by van Oort et al. (1994). This concept of "reflection coefficient" is further explained hereinafter, and a theoretical equation shows the relationship between reflection coefficient σ and two key parameters of the WBM/shale system, i.e., the average pore radius a and radius of hydrated ion $r_s$. This relationship is then used to show improved WBM design by enhancing the in situ osmotic efficiency of WBM/shale systems to improve borehole stability.

Mechanisms Governing Strength-Water Content Relationship

Results presented by van Oort et al. (1994) and Hale et al. (1992) indicate that when a chemical potential difference exist between drilling fluid and shale, water could be moved into or out of the shale. This movement of water concurred with the alteration of rock strength and suggested a fundamental mechanism for strength modifications in shales: when the water content was reduced, the shale strength increased and vice versa. The influence of water content on shale strength is well established[10-12]. Several mechanisms summarized below are used to explain the influence of moisture content on shale strength. None of these mechanisms can be discounted outright, but some are more likely than others for certain shale type and certain loading and environment conditions.

Fracture Energy Alteration: Fracture energy alteration is the mechanism commonly used to explain moisture effects on rock strength. This explanation uses the classical Griffith fracture criterion which states[13]:

$$\sigma_t = \left(\left[\frac{2E\gamma}{\pi a}\right]\right)^{1/2} \quad (1)$$

where $\sigma_t$=tensile stress necessary to cause a crack growth
E=Young's modulus
γ=surface energy
a=one-half crack length Although this criterion is defined for tensile stress situations, experimental observations suggest that strength in compression is affected by tensile brittle cracking and energy exchanges[14-15], so that, phenomenologically, the Griffith criterion can be used in compressive stress situations. If it is assumed that Equation 1 holds, where γ is the energy required per unit advance of the crack (i.e. the work for fracture), and a is some measure of critical flaw length, then if γ is lowered with the absorption of water, the fracture strength will be lowered.

Pore Pressure Change: The concept of effective stress law is used to describe the influence of pore pressure on the strength of the rock with interconnecting pores. Several investigators[5,16] have examined this effect in shales and low porosity rocks and have concluded that the effective stress concept was valid if the loading rate was slow enough so the pore pressure continuity was maintained within the sample. Significant increase in shale strength was observed when shales are tested at high strain rates[17,18]. At high strain rates in low permeability rocks, the fluid flow is restricted because there is insufficient time for the fluid to fill each micro crack that starts to grow. As a result of this, the internal pressure in the crack drops, which increases the normal effective stress acting on the crack. This suppresses the crack growth and increases strength.

Change In Frictional Characteristics: The strength of the shale can also be altered by change in water content due to the alteration in the frictional characteristics of the shale. Wash (1965) derived a theoretical expression relating the elastic modulus of the rock and the coefficient of friction of the sliding crack. The elastic modulus of the shale is affected by the moisture content: the higher the moisture content, the lower the elastic modulus. Thus an increase in moisture content also leads to reduction in the coefficient of friction of the sliding crack and hence to lower strength.

Chemical and Corrosive Effects: One can visualize physical changes in the shale during hydration especially if expandable clay minerals are present. If the cementing minerals present in the shale are partly soluble in water, an increase in water content could deteriorate the cementation between grains, thus decreasing the strength of the shale. On the other hand, particle cementation could be aided by drying. Dehydration not only brings adjacent particles close enough together to permit cementing, but it can also lead to the precipitation of soluble cementing materials from pore water.

Change in Capillary Tension: Capillary tension contributes to shale expansion and hence strength as many investigators have noted[20,21]. Some shales exhibit reversible swelling, while others disintegrate. The worst of the latter category are those which contain expandable clay minerals, particularly the montmorillonite group. These minerals expand by adding interlayer water molecules into their structure, which, although in itself is a reversible process, breaks down the rock due to unequal local pressures. Consequently, if a shale contains these minerals it is likely to disintegrate rapidly when exposed to water. The phenomenon of capillary compaction was used to explain the increase in shale strength as a result of dehydration[4].

One is led to suppose that the alteration in shale strength observed in the laboratory and in the field as a result of either dehydration (increase in shale strength) or hydration (decrease in shale strength) may actually be due to a combination of some or all of the above mechanisms.

Relationship Between Hydraulic and Osmotic Pressure Gradients and Its Effect on the Diffusion Rate of Water The conceptual basis of the coupled mechanical/chemical potential borehole stability model was presented by Mody et al. (1993). The fundamental basis of this model was the assumption that an osmotic barrier (i.e., semipermeable membrane) exists between the shale and the drilling fluid. For OBMs this assumption was validated[3]. In case of WBMs, experiments conducted under in situ conditions demonstrate that the shales can have properties that resemble a range of permselective characteristics, ranging from semi-permeable membrane (i.e. complete ion restrictive) to a leaky-membrane (selective ion restriction)[1,2 and 9]. The concept of "reflection coefficient" was first introduced by Staverman in 1951[28] to quantify the membrane efficiency (i.e., leakiness). The fundamental basis of this concept has been applied to understanding drilling fluid/shale interaction and its impact on borehole (in) stability. In this section a theoretical equation based upon the thermodynamics of the system is presented relating the hydraulic and osmotic pressure gradients to the rate of movement of water. A relationship is obtained in terms of flow rates, osmotic pressures and hydraulic pressures and can be expressed as follows (for details see the Appendix):

$$Q = -KA\overline{V}_o \left[\frac{dp}{dx} - \frac{d\pi}{dx}\right] \quad (2)$$

Thus based upon the thermodynamic principles, it is shown (Equation #2) that osmotic pressures acts as a negative hydraulic pressure in regulating the rate of water movement.

Equation #2 can be applied to represent the diffusion of water in any system which is heterogeneous with respect to dissolved solutes, especially if the dissolved solutes are restricted in their movement by physical forces and/or mechanical barriers. It can be applied to the movement of water through shales where the net ionic movement could be restricted when shales are subjected to in situ stresses. It can also be applied to the diffusion of water through the semi-permeable membrane provided by the OBM.

The Influence of Free Energy and Hydraulic Pressure Gradients on the Movement of Water Through Non-ideal Membrane Systems When dissolved solutes are restricted in their movement through a membrane either by physical (chemical, electrical or thermal) forces or mechanical barriers, then the osmotic (chemical, electrical or thermal) pressure acts as a negative hydraulic pressure in regulating the rate of water movement. The practical implications of this phenomenon is important in understanding the drilling fluid/shale interaction process and its impact on wellbore (in)stability. As previously stated, one of the main mechanisms governing borehole instability in shale is the pore pressure penetration effects obtained as a result of the hydraulic pressure gradient between the drilling fluid and the formation. The effectiveness of the OBMs in terms of borehole stability has been previously established[3]. OBMs possess properties to alleviate the undesirable effects of pore pressure penetration, by mainly preventing hydraulic pressure communication into the formation due to the presence of the capillarity effects. Also, the OBMs provide the semipermeable membrane, whereby the activity or the water phase salinity of the system can be engineered to develop chemical osmotic pressures to counteract or neutralize the hydraulic driving force. As stated earlier, the interaction process between the WBMs and shale is more complex. A more through understanding of the interaction process including the driving forces and the transport mechanisms at the fundamental level is necessary to gain insights that could lead to more effective WBM system design.

SUMMARY OF THE INVENTION

The objects of the present invention are accomplished, generally, by the provision of a water-based drilling fluid for use in shale formations having a given average pore size, wherein said drilling fluid comprises a drilling fluid additive having dissolved molecular solutes sized so as to allow said pores to at least partially restrict said solutes.

Another feature of the invention is accomplished, generally, by the provision of a drilling fluid additive having dissolved molecular solutes of at least two different radii to enhance the restriction of said solutes by said shale pores.

As an additional feature of the invention, dissolved molecular solutes are chosen as a drilling fluid additive to reduce the activity of the water in such water-based drilling fluid.

As further features of the invention, a first additive having dissolved molecular solutes sized to allow shale pores to at least partially restrict the solutes, and a second additive selected to reduce the activity of the water, are combined in a water-based carrier, and variously used as a spotting fluid, or as a lubricant, or as a fluid for strengthening shale formations or as a completion fluid in shale formations.

Figure 1:
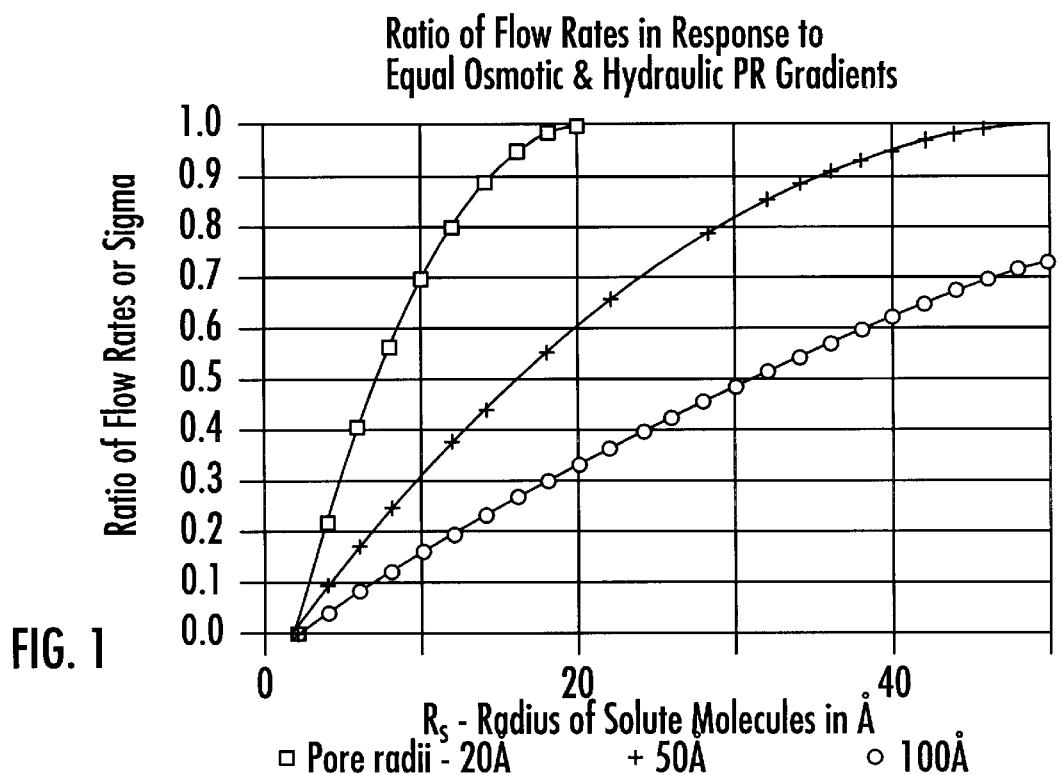
FIG. 1 is a graph of the radii of solutes plotted against the ratio of flow rates.

Some of the major issues concerning WBM/shale interaction that need to be addressed are:

1. The effectiveness of osmotic (chemical) pressure in the movement of water in a system that partially restricts the solute transfer (i.e., leaky membranes).

2. What fundamental properties of the system govern the relative effectiveness of the divining forces (i.e., hydraulic pressure and chemical potential) to cause water movement? An overview of the fundamental flow and driving forces and the way they can be handled conceptually addresses some of the key issues. The objective is that these concepts can be applied practically to enhance the performance of the WBMs systems.

DETAILED DESCRIPTION OF THE PREFERRED EMBODIMENTS

Brief Overview of Flow and Driving Forces

The state of a mass of liquid water has been described as a somewhat diffuse, or incomplete crystal[24]. Because of the incomplete nature of its crystal form, the water "crystal" is easily deformed by forces such as pressure. This deformation and the consequent translatory movement of mass of water in response to a pressure are known as viscous flow. These are the dominant form of water movement in large shale pores.

In addition to this viscous movement, which involves motion of the whole semicrystalline mass of water, diffusion takes place. The theories of viscous and diffusive movements in bulk solution are well advanced. However, there has been a reticence toward applying these theories directly to the movement of water in finely porous media like shale. The fact that clay-water-ion interaction occurs has raised doubts concerning the applicability of these theories to such a system. Kemper (1961) presented a method of adapting these classic equations to porous media, with the understanding that much is not known about the micromechanisms involved in the clay-water-ion system, and that secondary interactions probably exists between diffusive and viscous types of movements. Direct superposition of the classic equations for diffusive and viscous flow was used to develop a theory to handle systems where both types of flow occur. In context with the objectives of this invention, it is appropriate to bypass the theoretical intricacies, and instead, focus the discussion on the practical implications of the theory to gain the following important insights:

1. Viscous flow takes place in response to the pressure (hydraulic) gradient in the water while diffusive flow takes place in response to the gradient of the molar free energy of water.

2. The influence of film thickness (i.e., average pore diameter) is significant on the relative effectiveness of the molar free energy gradients compared to the pressure gradients as water moves, and in general, the smaller the average pore diameter, the more effective is the influence of the molar free energy to cause movement of water. For smaller dimensions of the film (@ 20Å) the influence of molar free energy is comparable to that of equivalent pressure (hydraulic) gradients.

3. For larger pore diameters the free energy gradient equivalent to a osmotic stress gradient plays a minor role in determining the direction and magnitude of flow compared to an equivalent pressure (hydraulic) gradient. It is important to note that the above observation was based upon the assumption that clay-water interaction (surface electrical charges) does not enter the picture. When clay-water interactions are known to exist, adequate adaption of the theory may be necessary to minimize the error between theoretical and observed values. Experimental data was provided which showed a reasonable agreement with calculated values[26]. Qualitative agreement between calculated and experimental results indicate that equations of viscous flow and diffusive flow may be superimposed upon each other to estimate the direction and amount of flow in shales with small pores.

The concepts presented above were extended in accordance with the present invention to include restrictions of solute by membranes and consequent effects on the movement of water. It has been found that the osmotic pressure and hydraulic pressure differences are equally effective in moving water through the membrane when the solutes are completely restricted by the membrane. One of the key conclusions of this study was that the viscous flow is the major mechanism by which water moves through membranes (solute completely restricted) in response to osmotic and hydraulic pressure gradients and that the flow caused by diffusive mechanism is negligible. When solutes are only partially restricted by the membrane (e.g., WBM/shale system), it was found that the osmotic pressure differences (as anticipated) are less effective than hydraulic pressure differences in moving water through membranes. For partial restriction of solute, an equation was derived including the sizes of the solute molecule and the pores to compare the flow rates due to partial restriction of solutes in response to osmotic and hydraulic pressure gradients of equal size[27]. The equation is expressed as follows:

$$\left(\left[\frac{(\Delta Q/\Delta t)_o}{(\Delta Q/\Delta t)_H}\right]\right)_{\Delta P=-\Delta \pi} = \left[1 - \frac{(a-r_s)^2}{(a-r_w)^2}\right] \quad (3)$$

where $(\Delta Q/\Delta t)_O$=flow rate due to osmotic pressure gradient
where $(\Delta Q/\Delta t)_H$=flow rate due to hydraulic pressure gradient
$\Delta P$=hydraulic pressure gradient
$\Delta \pi$=osmotic pressure gradient
a=pore radius
$r_s$=solute radius
$r_w$=radius of water molecule In FIG. 1, the ratios of flow rates due to osmotic and hydraulic pressure differences of equal magnitude are plotted versus average radii of the solute molecule for three different values of the average pore radii of the shale. Similar ratios of flow rates are plotted in FIG. 2 against average pore radii of shale for five different values of radii of the solute molecule ranging from 3 Å to 30 Å.

It should be noted that the above Equation (#3) is valid only when the radius of the solute is equal to or less than the radius of the pore (i.e. $r_s \leq a$). When $r_s > a$ the solute is completely restricted and the osmotic and hydraulic pressures are equally effective in causing flow through a membrane.

For electrically neutral systems, ignoring clay-water interaction, the Staverman reflection coefficient σ was shown to be equal to the right hand side of the above equation[29].

$$\sigma = \left[1 - \frac{(a-r_s)^2}{(a-r_w)^2}\right] \quad (4)$$

Discussions

Figure 2:
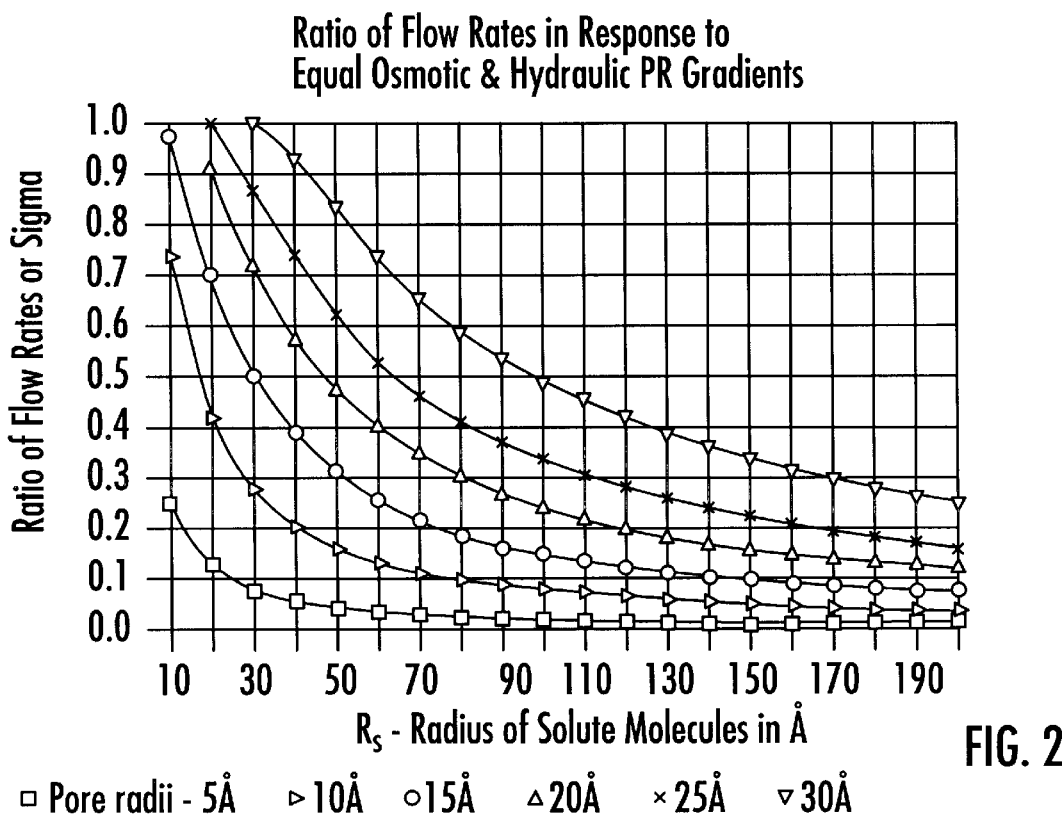
FIG. 2 is a graph of the average pore radii of shales plotted against the ratio of flow rates.

As illustrated in the plots in FIGS. 1 and 2, it is clear that one of the key parameters that governs the magnitude of the reflection coefficient σ (i.e., membrane ideality) of a "leaky system" is the relative size of the solute radii "$r_s$" compared to the average radii of the pore throat "a." When $r_s > a$, the solute is completely restricted and the system behaves as a perfect semipermeable membrane. It has been shown[3] that oil films in invert oil emulsion muds (IOEMs) constitute highly selective membranes (σ=1). Thus by optimizing the water phase activity of the IOEM using solutes, an osmotic flow from the formation to the drilling fluid can be induced. This flow can compensate or over take the effective hydraulic flow. This process can lead to an increase in formation strength (due to reduction in near wellbore water content) and alteration of near wellbore effective stresses (as a result of change in near wellbore pore pressure). Both processes (when optimized) are shown to benefit borehole stability[1].

In WBMs, the issue of capillary entry pressure is irrelevant and no semipermeable "film" promoting high effective osmotic flow exists. However, for a shale/WBM system to acquire rate/perm-selectivity properties comparable to that of IOEM (i.e., σ=1), the effective radius (hydrated) of the solute molecule that imparts activity to the drilling fluid has to be in theory at least equal to or greater than the average effective pore throat radii of the shale in situ. FIGS. 1 and 2 and Equation 4 can be used to estimate σ for a WBM/shale system provided some estimates of the average solute radius "$r_s$" and average shale pore radii "a" are known. One proposed methodology to estimate the molecular radii of the solute is to calculate the radius of the sphere which would contain the weight of a single solute molecule, using densities observed for these compounds in their pure state[27]. The radius of the water molecule used in the calculations (FIGS. 1 and 2) was 1.9 A.

The pore radii of shales can be measured utilizing the mercury injection technique. Due to capillary entry pressures the mercury injection technique is limited to larger pore throats in the range greater than 100 Å. It can be looked upon as a technique that estimates pore throats that tend toward the upper bound. Also, the shale sample is unstressed when the measurements are made. Under in situ conditions the shale pore radii will be smaller than that estimated by this technique.

One important general observation is that even when the size of the solute molecules is several factors smaller than the pore size, relatively high values of σ are estimated. It is critical to understand that the magnitude of the osmotic flow is not governed by the magnitude of σ alone but is governed by the product of σ and the theoretical osmotic pressure difference Δπ (between the drilling fluid and the shale pore fluid). See, for example, Equation 9. It is this product (σ×Δπ) that needs to be optimized (either by manipulating the activity of the WBM or by manipulating the magnitude of sigma, or by manipulating both) to fully exploit the potential of osmotic flow in shales with WBM for shale stabilization. For example, the osmotic flow in shales with small (but non zero) reflection coefficients may be increased by lowering the activity of the drilling fluid which generates high value of Δπ, or one can lower the activity in combination with improving the membrane efficiency by reducing pore radii, thus maximizing the product of σ×π, in accord with the present invention.

It is well known in the art that the radius of any given molecule can be easily determined. Various chemistry and physics handbooks list the radii of the common molecules. If no listing is readily available, the effective radius of a salt ($r_s$) for example, in its hydrated state, can be calculated by the well-known formula of $$r_s = \sqrt[3]{r_{CAT}^3 + Nr_{an}^3 + hr_w^3},$$

where $r_w$ is the radius of a water molecule, h is the salt hydration number, $V_{an}$ is the ionic radius of the cation, n is the number of anions per cation, and $r_{cat}$ is the ionic radius of the cation.

Pore Size Analysis

Figure 3:
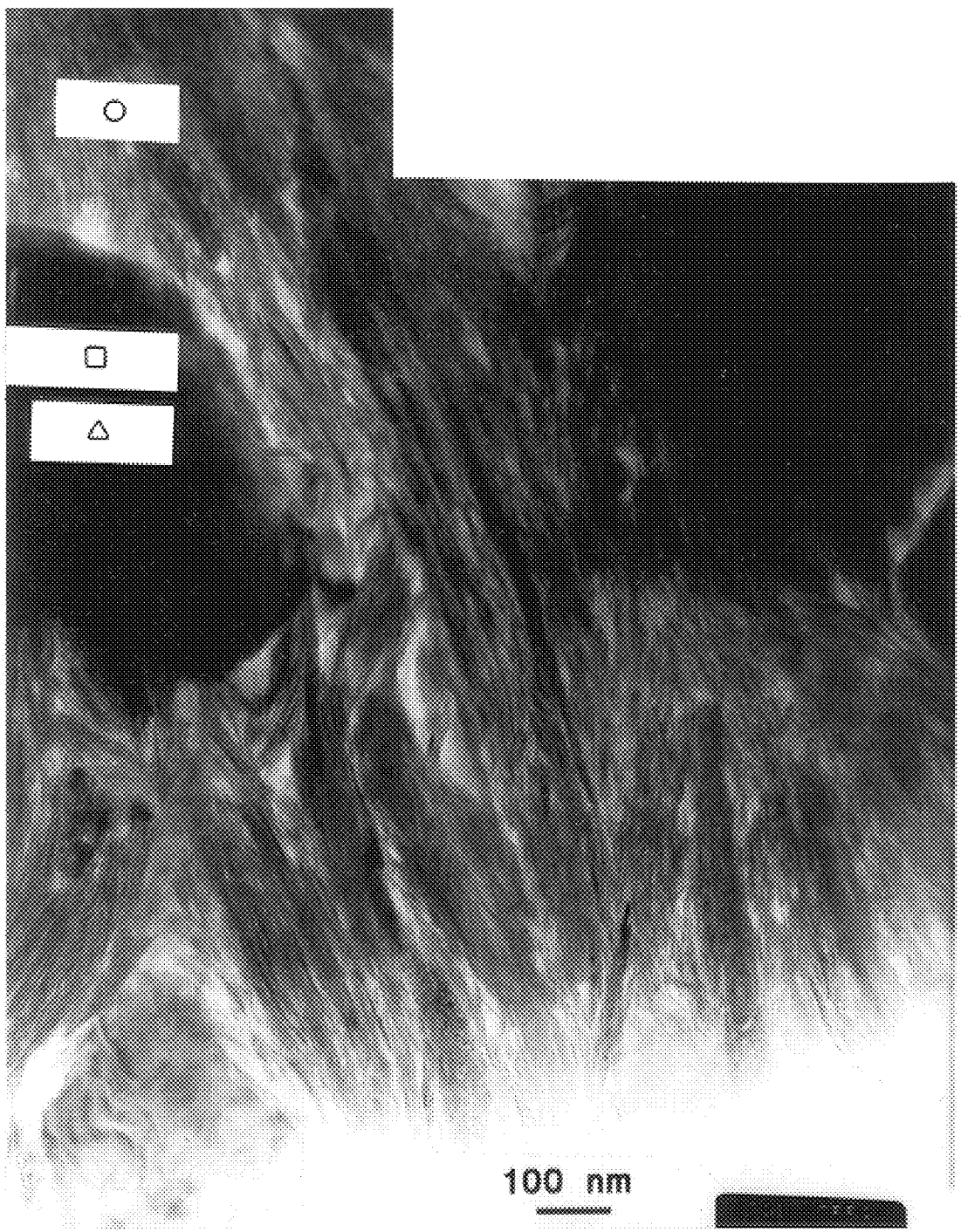
FIG. 3 is an electron micrograph of a representative shale from the Gulf of Mexico.

A transmission electron micro graph of a deep-water Gulf of Mexico shale was presented by Mody et al. (1993), which is shown here in FIG. 3. The micrograph clearly demonstrates that the pore throats are heterogeneous, but a vast majority of the observable surface area is associated with the clay which has pore spacing of less than 20 Å. In addition there are pore spaces that are easily 100 Å and larger within this sample. However, in examining this micrograph, one should keep in mind that the largest component of relative surface area is associated with the compact tight pore spaces and that this is a micrograph of a shale that has undergone stress relief. In reality, the pore spacing would be even smaller when this shale is under in situ stress. Thus, the physical dimensions of the pore throats (ignoring electrical effects) are consistent with the ionic-selective character of the shale. If the concepts of electrical effects, tortuosity and path flow are considered in the context of the pore throat dimensions, then there are compelling reasons to assume that the effective pore throat can be even smaller.

Values of σ reported in the literature for different WBMs/shale systems range from low values (1 to 2% efficiency with KCl and CaCl$_2$ as solutes) to a high value of approximately 10% efficiency with Al$_2$(SO$_4$)$_3$ as solute[2]. These numbers, of course, have no meaning except in the context of knowing the average pore size and the radius of the solute added to the drilling fluid in accord with the present invention. These tests were conducted on similar shale samples under identical conditions. The larger solute [Al$_2$(SO$_4$)$_3$] resulted in a higher value of the reflection coefficient compared to the relatively smaller size of KCl and CaCl$_2$ solutes. These observations are consistent with the theoretical bases presented herein.

The success of the various polyglycol water-based systems in terms of borehole stability is explained in part on the chemistry of such systems to viscosify filtrates and to form very low permeability emulsion barriers in shales[30-31]. This mechanism is perceived to minimize fluid invasion in shales. The theory presented here can also be applied to provide an alternate explanation to support the effectiveness of the polyglycol systems, in that, the low permeability emulsion barriers reduce the effective pore radii in shales, thus improving the membrane efficiency which leads to stronger osmotic pressures to counteract hydraulic flow into the shales. Based upon the plots in FIGS. 1 and 2, it is encouraging to note that, even for smaller diameter solutes (<10A) and for a range of typical pore radii (e.g., 20 to 100A) the values of "sigma" obtained are quite decent (2 to 18%). In actuality, the pore radii range may be much smaller and the presence of the electrical effects may lend to higher values of "sigma."

General Criteria for Design of Effective WBM Systems

Based upon the theoretical understanding of the drilling fluid/shale interaction, the solutes that appear to be most efficient in WBM (in terms of restricting pore pressure communication) are those that give low water activity and have higher solute radii (i.e., higher molecular weight).

As set forth in the attached Appendix, there is a series of the following related equations $$v = -K\overline{V}_o \left[ \frac{dp}{dx} - Rt \sum \frac{dm_s}{dx} \right], \quad (5)$$

$$v = -K\overline{V}_o \left[ \frac{dp}{dx} - \frac{d\pi}{dx} \right] \quad (6)$$

$$v = -K \left[ \overline{V}_o \frac{dp}{dx} + Rt \frac{d(\ln \overline{a}_o)}{dx} \right] \quad (7)$$

$$v = -K\overline{V}_o \left[ \frac{dp}{dx} - \frac{d\pi}{dx} \right] \quad (8)$$

which vary only in which assumptions are made. The total flow (Jv) of liquid into or out of a membrane is derived from the foregoing Equations 5–8, and can be expressed as follows:

$$Jv = Lp(\Delta P - \sigma \Delta \pi)/\Delta x \quad (9)$$

where Lp is the hydraulic conductivity according to Darcy's law.

The direction of flow is taken positive in the direction from the drilling fluid to the shale. Lp relates to the hydraulic conductivity in Darcy's law. ΔP is the difference in the hydraulic pressure between the drilling fluid (i.e. mudweight $P^{DF}$) and the shale pore fluid (i.e. pore pressure $P^{SH}$). Therefore $\Delta P = P^{DF} - P^{SH}$ is the difference in the hydraulic potential between the drilling fluid and the shale pore fluid. σ is a dimensionless parameter referred to as "reflection coefficient" which quantifies the extent of ideality or the efficiency of the semi-permeable membrane. An ideal semi-permeable membrane system is characterized by σ=1, indicating all solutes are "reflected" by the membrane and only water molecules can pass. With decreasing reflectivity i.e. 0<σ<1, solute molecules can selectively transfer across the membrane. Such systems are usually referred to as "leaky" membrane system. Finally σ=0 represents a non-selective membrane system where all solutes species and solvent move freely and no osmotic effects occur. The differences in osmotic pressure, Δπ, between the drilling fluid and the shale pore fluid, which is defined in terms of water activity by:

$$\Delta \pi = \frac{RT}{V_w} / n\left(\frac{Aw^{SH}}{Aw^{DF}}\right) \quad (10)$$

where Vw represents the partial molar volume of water, and $Aw^{DF}$ and $Aw^{SH}$ denote the activity of the drilling fluid and the shale pore fluid respectively.

"Activity", sometimes discussed in the literature as activity coefficient, is discussed at length in *Oxidation States of the Elements and Their Potentials in Aqueous Solutions*, by Wenell M. Latimer, published by Prentice-Hall, Inc. in 1952, especially in its Appendix II, starting on its Page 349. On Page 6 of Chapter 1 of that same publication, the author indicates that > The activity coefficient may be thought of as the thermodynamic ionization constant, but the modern theory of strong electrolytes assumes that they are completely ionized, in the sense that the ions are capable of independent motion and that the apparent nonionization results from the forces acting between an ion and its neighbors in general rather than from its attraction to any particular ion. The Debye and Huckel, theory has been very successful in calculating activity coefficients from the electrostatic forces in very dilute solutions. At high concentrations other factors enter, such as the force of repulsion between the large hydrated ions or the change in the hydration of the ions, and the activity coefficient often becomes greater than unity, or the apparent ionization greater than 100 per cent. The theoretical treatment of the concentrated solutions is still incomplete. Appendix II should also be consulted for a discussion of the principle of ionic strength.

In any event, the water phase activity, as understood by those in this art, is considered to be analogous to relative humidity, in that an activity of 1.0 is analogous to 100% humidity. Activities below 1.0 thus have the ability to take on water. With the activity of the drilling fluid reduced, the water can more easily flow out of the shale and into the drilling fluid.

Equation 9 shows that the volume flow Jv driven by a hydraulic pressure difference can be counterbalanced or enhanced by an osmotic pressure effected by a difference in chemical potential. Note that the extent by which the osmotic pressure acts is scaled down by the reflection coefficient σ. Thus, for a non-ideal system (0<σ<1) the extent of the osmotic pressure is less than predicted by Equation 10. The transport of solute across a non-ideal membrane system reduces and eventually equilibrate the initial chemical potential imbalance. Osmotic phenomena in these systems is therefore of a transient nature.

For an ideal system (σ=1), the osmotic pressure and hydraulic pressure differences are equally effective in moving the water through the membrane as the solutes are completely restricted by the membrane. For partial restriction of solute i.e. "Leaky" systems the "reflection coefficient" can be expressed as follows:

$$\sigma = \left[1 - \frac{(a - r_s)^2}{(a - r_w)^2}\right] \quad (11)$$

where a=pore radius (Å), $r_s$=solute radius (Å), and $r_w$=radius of water molecule (Å).

As illustrated in the plots in FIGS. 1 and 2, it is clear that one of the key parameters that governs the magnitude of the reflection coefficient σ (i.e., membrane ideality) of a "leaky system" is the relative size of the solute radii "$r_s$", compared to the average radii of the pore throat "a". When $r_s$>a, the solute is completely restricted and the system behaves as a perfect semipermeable membrane. It has been shown that oil films in invert oil emulsion muds (IOEMs) constituted highly selective membranes (σ=1). Thus, by optimizing the water phase activity of the IOEM using solutes, an osmotic flow from the formation to the drilling fluid can be induced. This flow can compensate or overtake the effective hydraulic flow. This process can lead to increases in formation strength (due to reduction in near wellbore water content) and alteration of near wellbore effective stresses (as a result of change in near wellbore pore pressure). Both processes (when optimized) are shown to benefit borehole stability.

In WBMs, the issue of capillary entry pressure is irrelevant and no semipermeable "film" promoting high effective osmotic flow exists. However, for a shale/WBM system to acquire rate/perm-selectivity properties comparable to that of IOEM (i.e. σ=1), the effective radius (hydrated) of the solute molecule that imparts activity to the drilling fluid has to be, in theory at least, equal to or greater than the average effective pore throat radii of the shale in situ. FIGS. 1 and 2 and Equation 11 can be used to estimate σ for a WMB/shale system provided some estimates of the average solute radius "$r_s$", and average shale pore radii "a" are known. One proposed methodology to estimate the molecular radii of the solute is to calculate the radius of the sphere which would contain the weight of a single solute molecule, using densities observed for these compounds in their pure state. The radius of the water molecule used in the calculations (FIGS. 1 and 2) was 1.9 Å.

One important general observation is that even when the size of the solute molecule is several factors smaller than the pore size, relatively high values of σ are estimated. It is critical to understand that the magnitude of the osmotic flow is not governed by the magnitude of σ alone but is governed by the product of σ and the theoretical osmotic pressure difference Δπ (between the drilling fluid and the shale pore fluid). It is this product (σ×Δπ) that needs to be optimized (either by manipulating the activity of the WBM or by manipulating the magnitude of σ) to fully exploit the potential of osmotic flow in shales with WBM for shale stabilization. For example, the osmotic flow in shales with small (but non zero) reflection coefficients may be increased by lowering the activity of the drilling fluid which generates high value of Δπ.

In understanding the principles of the present invention, it is helpful to review some of the basic tenants of osmosis. Osmotic potentials are defined by the well known equation $$\pi = \frac{RT}{v} \ln p/po \qquad (12)$$

where V is the partial molar volume of water, where p is the vapor pressure of the solution and po is the vapor pressure of pure water, R is the gas constant, T absolute temperature.

Zemansky, in 1943 defined pressure as the time average change of momentum due to all molecular collisions. In liquid this pressure should be equivalent to the internal hydraulic pressure. When a solute is added to water, the hydraulic pressure of the liquid remains practically the same (except for a slight change in density which can usually be ignored in systems of interest to drilling engineering). However, the vapor pressure of interest to drilling to p, indicating a reduction in activity of water molecules, which in turn indicates a reduction in the contribution of water molecules to the hydraulic pressure of the solution. Thus, effectively, the introduced solute molecules cycate a complementary pressure, which along with the water molecule pressure, makes up the total internal pressure. In equation form this may be written as $$P=(P-\pi)+\pi \qquad (13)$$

where $\pi$ is the portion of the pressure due to the solute molecule, $(P-\pi)$ is the portion due to the water molecule, and P is the total internal hydraulic pressure of the solution.

Figure 4:
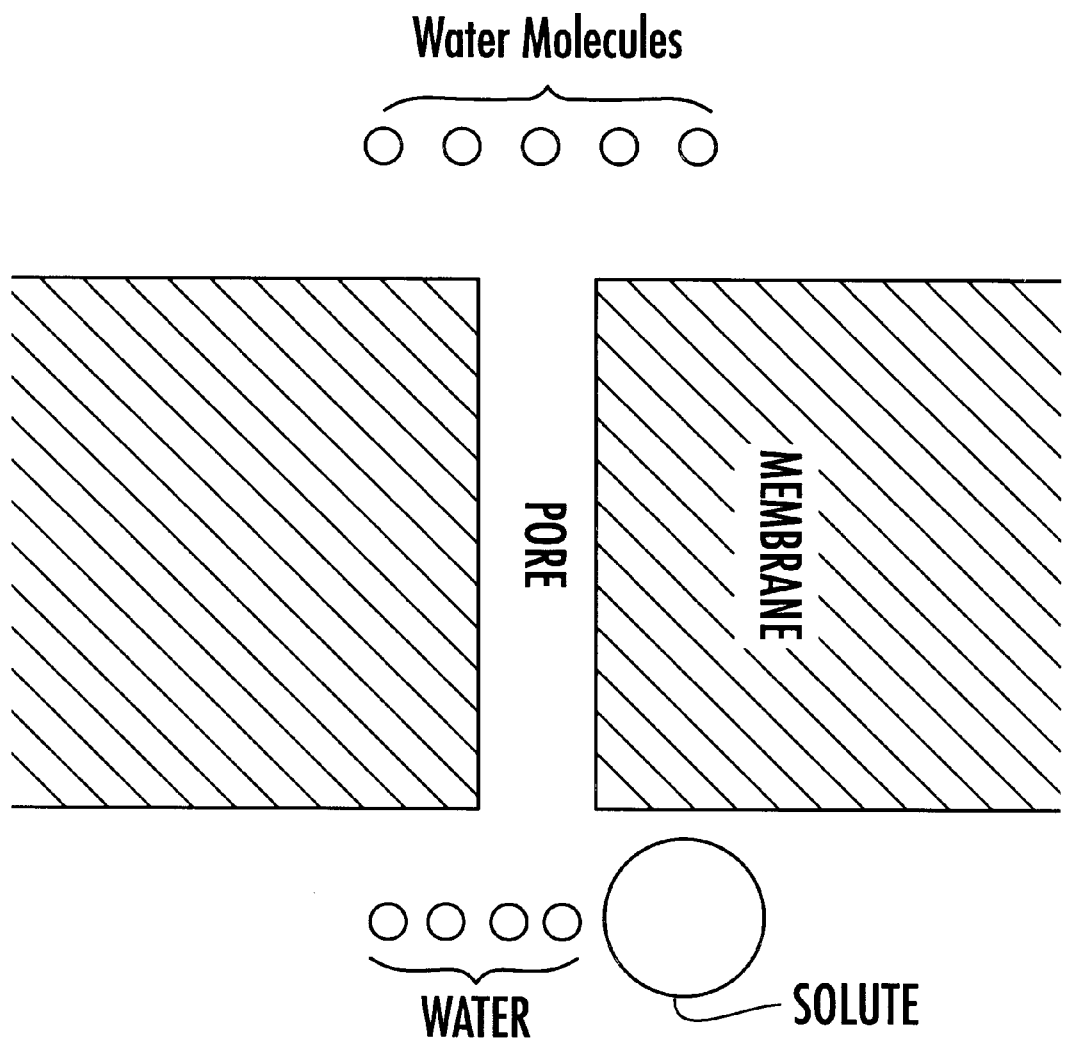
FIG. 4 diagrammatically illustrates an idealized membrane having a single pore, assuming water to the left of the membrane and a solution to the right of the membrane.

Consider a idealized membrane containing a single pore as shown in FIG. 4. Assume water on the left and a solution on the right with hydraulic pressure and temperature being the same on each side. As a result of their internal energy, the water and solute molecules are bouncing around or vibrating with the same kinetic energy for each species. The pressure at any plane will be proportional to the number and to the average kinetic energy of the molecules. On the left side, all the water molecules have the same opportunity to impact on the water just inside the pore opening. On the right side the water molecules have the chance to impact on the water just inside the pore, but the solute molecules is so large that when it strikes the pore area its impact is taken by the membrane rather than the water just inside the pore. Consequently, the water just inside the pore on the right side of the membrane will not have the $\pi$ component of the total internal hydraulic pressure. Thus the internal hydraulic pressure at the right end of the pore will be smaller than the hydraulic pressure at the left hand of the pore by the amount of $\pi$. Viscous flow through the pore should take place in response to this pressure difference and the flow rate should be equal to the flow rate caused by the hydraulic pressure difference equal in magnitude $\pi$.

The foregoing concept leads to a generalized formula for the membrane efficiency "$\sigma$", reading as follows:

$$\sigma = \left[1 - \frac{(a-r_s)^2}{(a-r_w)^2}\right] \qquad (14)$$

where a is the pore radius, $r_s$ is the solute radius and $r_w$ is the water molecule radius. Equation 14 is, of course, identical to Equations 4 and 11. By improving the efficiency of the membrane in accord with the present invention, the performance of WBMs used in drilling shale formations is tremendously enhanced. This is achieved by one or both of the following mechanisms:

a) increasing the size of $r_s$ (the solute molecule; and
b) decreasing the size of a (the shale pore radius).

Laboratory Experiments

To demonstrate the merits of the present invention, lab experiments using a Fann Linear Swellmeter, a hygrometer, and a Type A durometer were conducted to determine the chemistry needed to increase the matrix strength of shale while drilling through it with water base drilling fluids. The shale used in this study was obtained from offshore East High Island, Tex. To cause an increase in the shale matrix strength it was desired first to create a membrane across the surface of the shale. Then there was created the required chemical potential in the water phase of the drilling fluid to control the moisture content of the shale needed for a high matrix strength.

Chemical Potential

A simple solution in general is composed of a solvent, which is the phase having the greatest volume, and a solute, which is the substance being dissolved into the solvent. Both compounds initially have some chemical potential due to external forces such as the temperature and pressure of their surroundings, and internal forces due to their molecular bonding. When the two compounds are mixed all the forces (both external and internal) try to balance themselves. Raoult and Henry have devised laws describing this process mathematically.

1.) Raoult Law $$\mu_{liq} = \mu_{vap} + RT \ln p_A \qquad (15)$$

2.) Henry Law $$p_A = k \, x_A \qquad (16)$$

Equation 15 shows that the chemical potential "$\mu$" is related to the vapor pressure "p" by Raoult's law. Equation 16 shows that the vapor pressure is related to the mole fraction "X" of solvent in the solution by Henry's law. From vapor pressure data obtained with a hygrometer, one can determine the chemical potential of the solution. "R" in Equation 15 is the standard gas constant, and "T" is the temperature.

Osmotic Membrane

Osmotic membranes have been developed to separate the solute from the solvent in dilute solutions of ions where filtration would not be practical. An osmotic membrane is a porous material with pores small enough to prevent solute flow but large enough to allow the solvent to flow. A chemical imbalance is created by placing fluids with different concentrations (molalities) of solute on opposite sides of the membrane. The flow of solvent through the membrane into the solute rich solution causes the solution volume to expand which creates a pressure. The volume of solvent will increase until the chemical potential of the solute rich solution in the membrane equals the potential of the solution containing pure solvent. This pressure created by increases in solvent volume is called the osmotic pressure.

Shale Stabilization

Shales are composed of water dispersible silicates called clays which were formed by being heated, compacted, and ion exchanged with various minerals. The final shale product is left with certain pore sizes and chemical potentials based upon the temperatures, pressures, and chemical ions it was exposed to during its development.

The shale used in our Linear Swellmeter tests was collected from a well offshore East High Island, Tex. The shale was dried, ground to—100 mesh, and reconsolidated at 10,000 psi with 10% moisture to form a cylindrical core 0.5 inches high and 1.0 inch in diameter. The core was then let to stand in a desiccator at 100% relative humidity for 3 weeks until it contained approximately 22.0% moisture. This core had a relative humidity measured with the lab's hygrometer of 100% after the three week hydration period.

EXAMPLE 1

Figure 5:
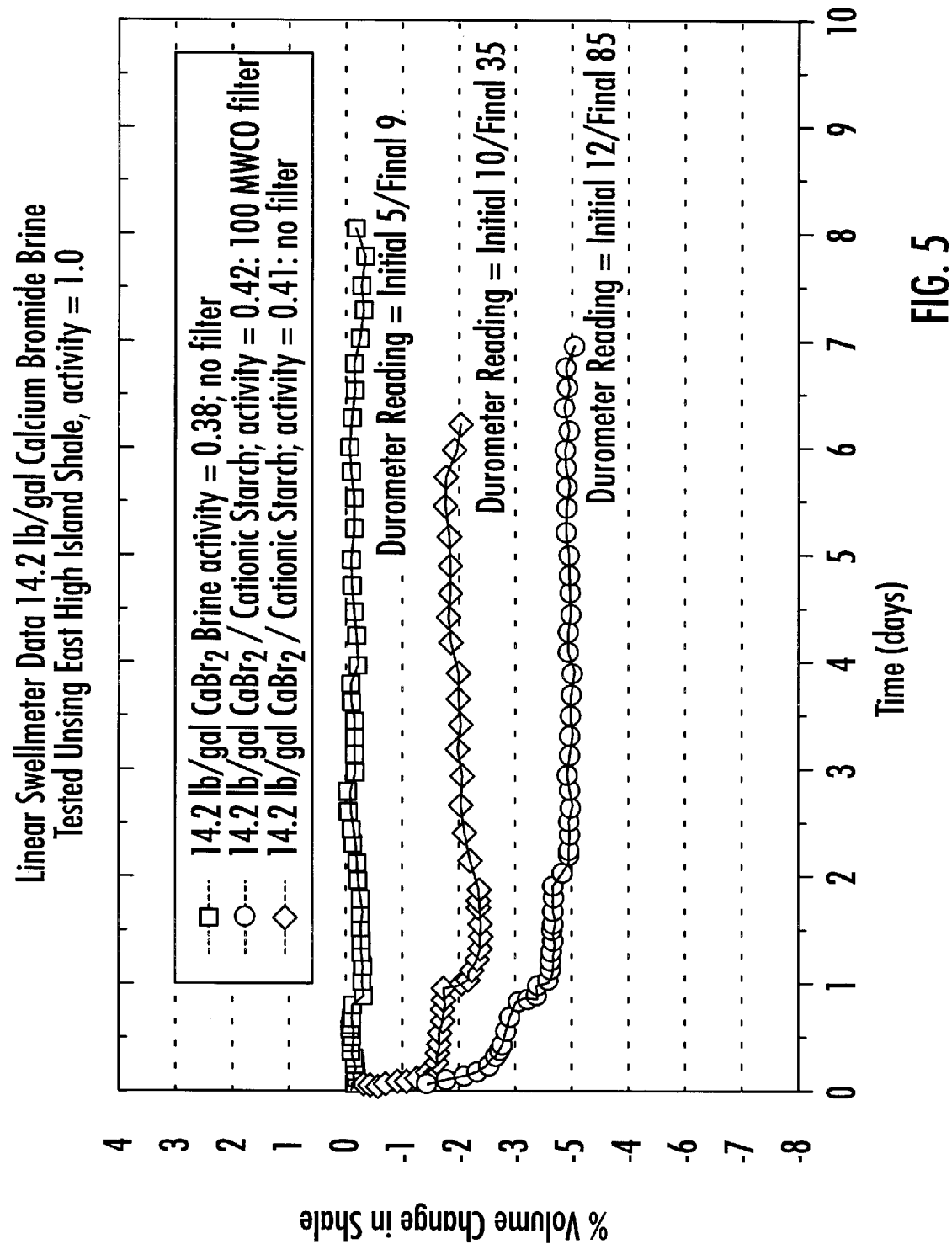
FIG. 5 illustrates graphically the effect of various solutes on membrane efficiency.

FIG. 5 shows the Linear Swellmeter data collected for the East High Shale core exposed to a 14.2 lb/gal calcium bromide brine that had an water phase activity of 0.38. It is observed that the fluids tested all had nearly the same water phase activities of approximately 0.4. After seven days exposure to the pure calcium bromide brine no volume change occurred for the shale. When the same shale was exposed to the 14.2 lb/gal calcium bromide brine with 4 lb/bbl of a cationic starch added, a 2.0% loss in core volume occurred in 6 days, and an increase occurred in the durometer reading from an initial value of 10 to a final value of 35. In the third test (FIG. 5), the shale core was wrapped in a 100 Dalton dialysis filter cloth and then exposed seven days to the 14.2 calcium bromide/cationic starch fluid. The largest loss in core volume of 4.0% was observed for the core wrapped in the dialysis cloth, and also the largest increase occurred in the durometer values from an initial reading of 12 to a final reading of 63. The starch seem to provide a membrane to allow water to flow from the core to create a loss in shale volume. The dialysis cloth artificially creates a layer of controlled pore radii to simulate downhole conditions.

EXAMPLE 2

Figure 6:
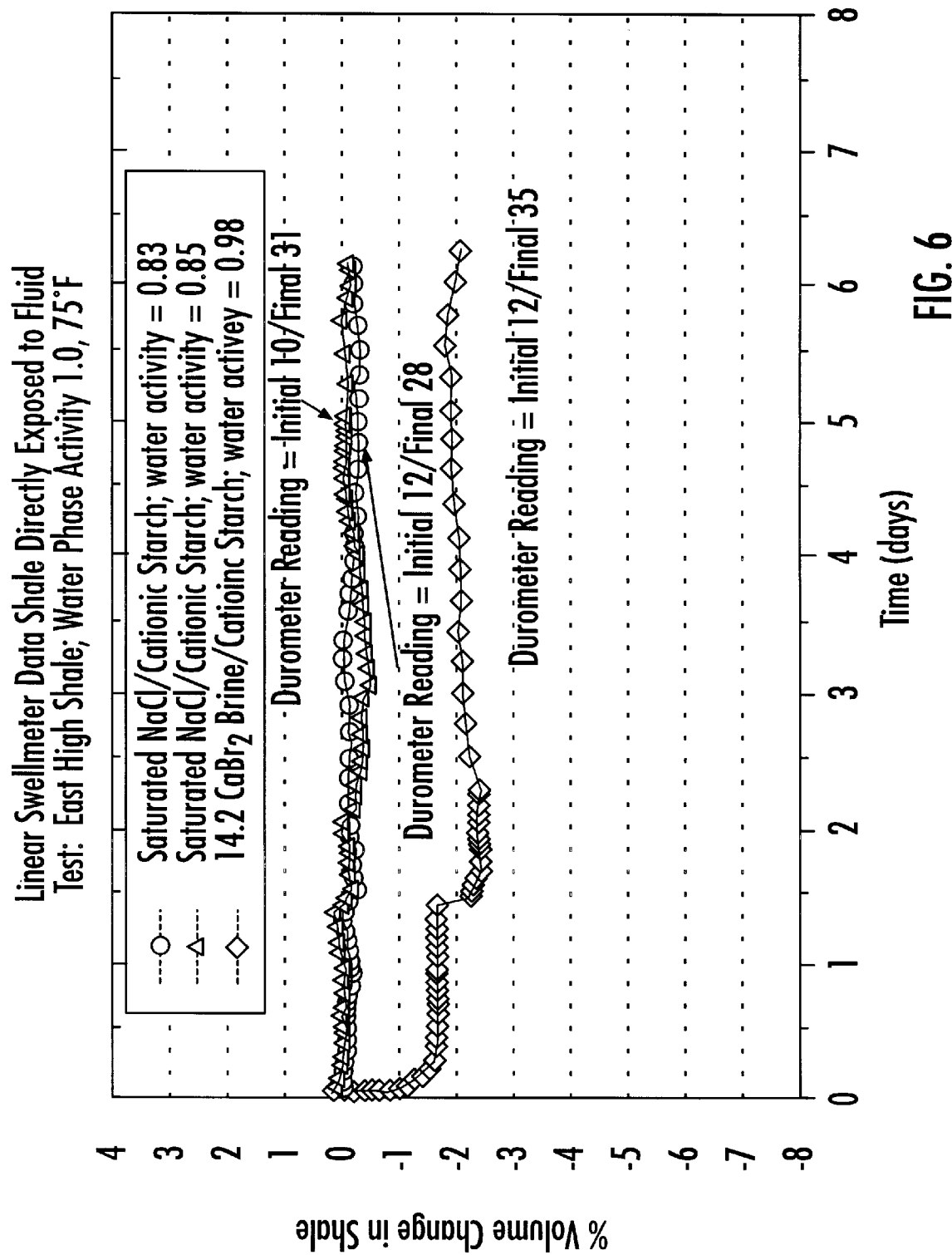
FIG. 6 illustrates graphically the effect of various solutes on membrane efficiency.

FIG. 6 shows the effects that fluid water phase activity has upon the volume change of East High Island shale cores in the Linear Swellmeter tests. In these tests two monovalent saturated salt solutions (sodium chloride and potassium chloride) were compared to the 14.2 lb/gal calcium bromide solution. 4 lb/bbl of cationic starch was added to each of the fluids to reduce fluid loss and create a membrane. The two fluids prepared with the monovalent salts had much higher water phase activities of 0.84, and were observed not to change the volume of the shale in a seven days Linear Swellmeter test. The calcium bromide solution, which has a lower activity of 0.38, caused a 2.0% loss in volume over the same seven day test period. The presence of the cationic starch enhanced (improved) the membrane efficiency.

EXAMPLE 3

Figure 7:
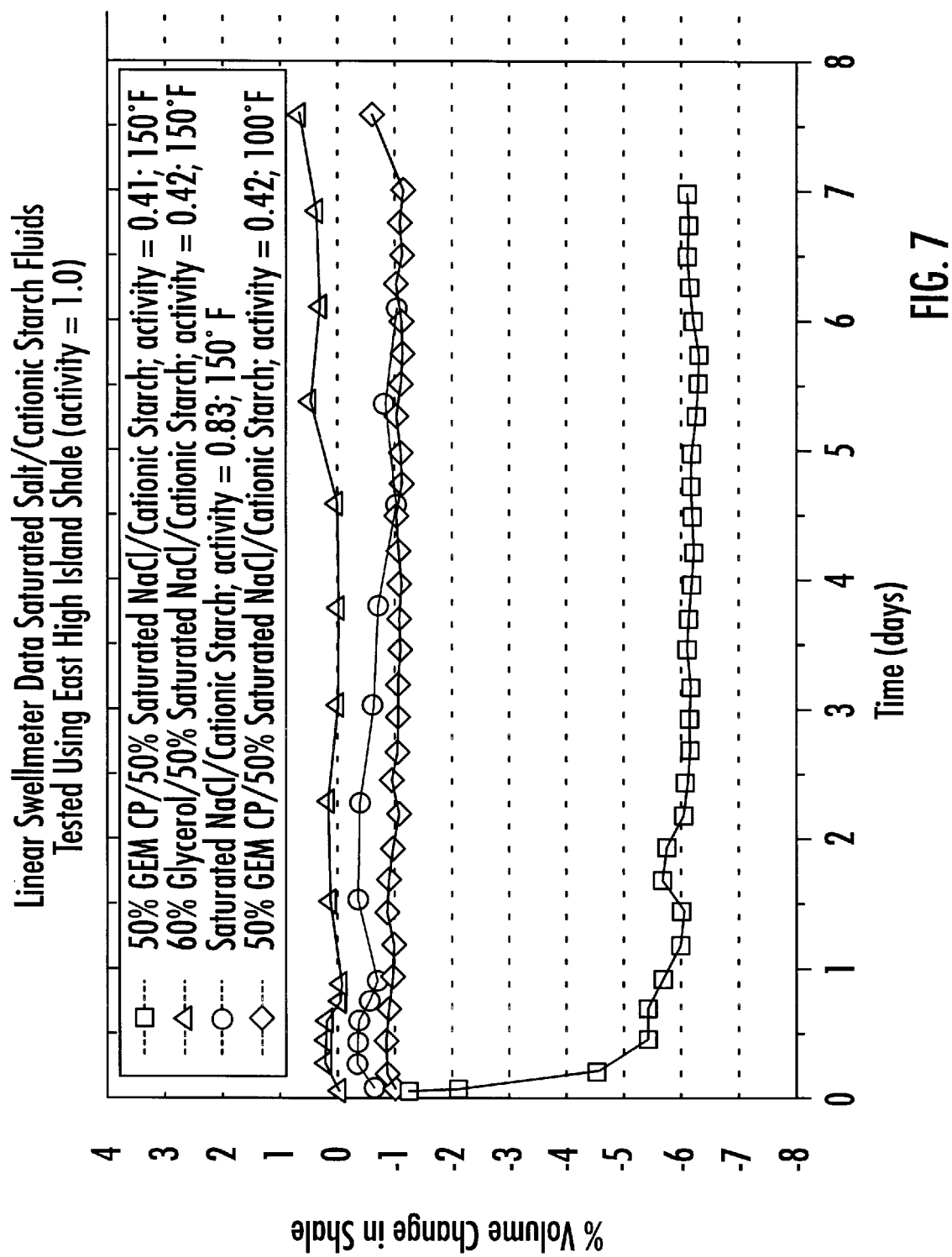
FIG. 7 illustrates graphically the effect of various solutes on membrane efficiency.
Figure 8:
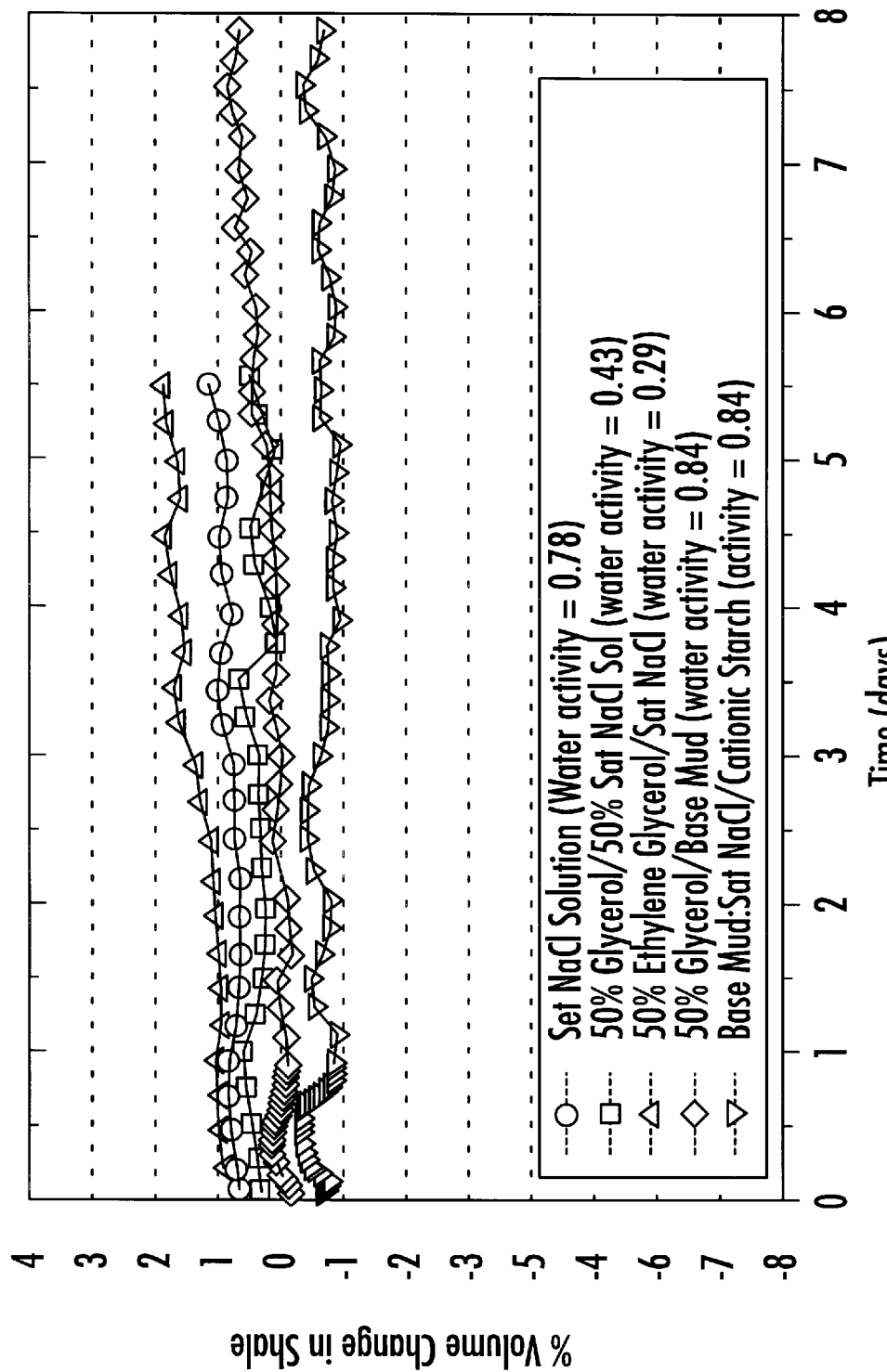
FIG. 8 illustrates graphically the effect of various solutes on membrane efficiency.

FIGS. 7 and 8 show that it requires both a fluid activity of approximately 0.4, and an insoluble oil phase in the water mud to create the optimum membrane and driving force to dehydrate a water saturated shale. The maximum decrease in volume occurred for the fluid having an activity of 0.4 (lab's hygrometer); and containing 50% GEM CP, which is a polyalkylene glycol. Since this fluid was tested at temperatures (150° F.) above the cloud point of the glycol solution, the GEM CP was made insoluble in water and is believed to have formed an emulsion that would block pores in the shale. The two low molecular weight water soluble compounds glycerol and ethylene glycol were observed to cause a slight increase in the volume of the East High Island shale core.

EXAMPLE 4

Figure 9:
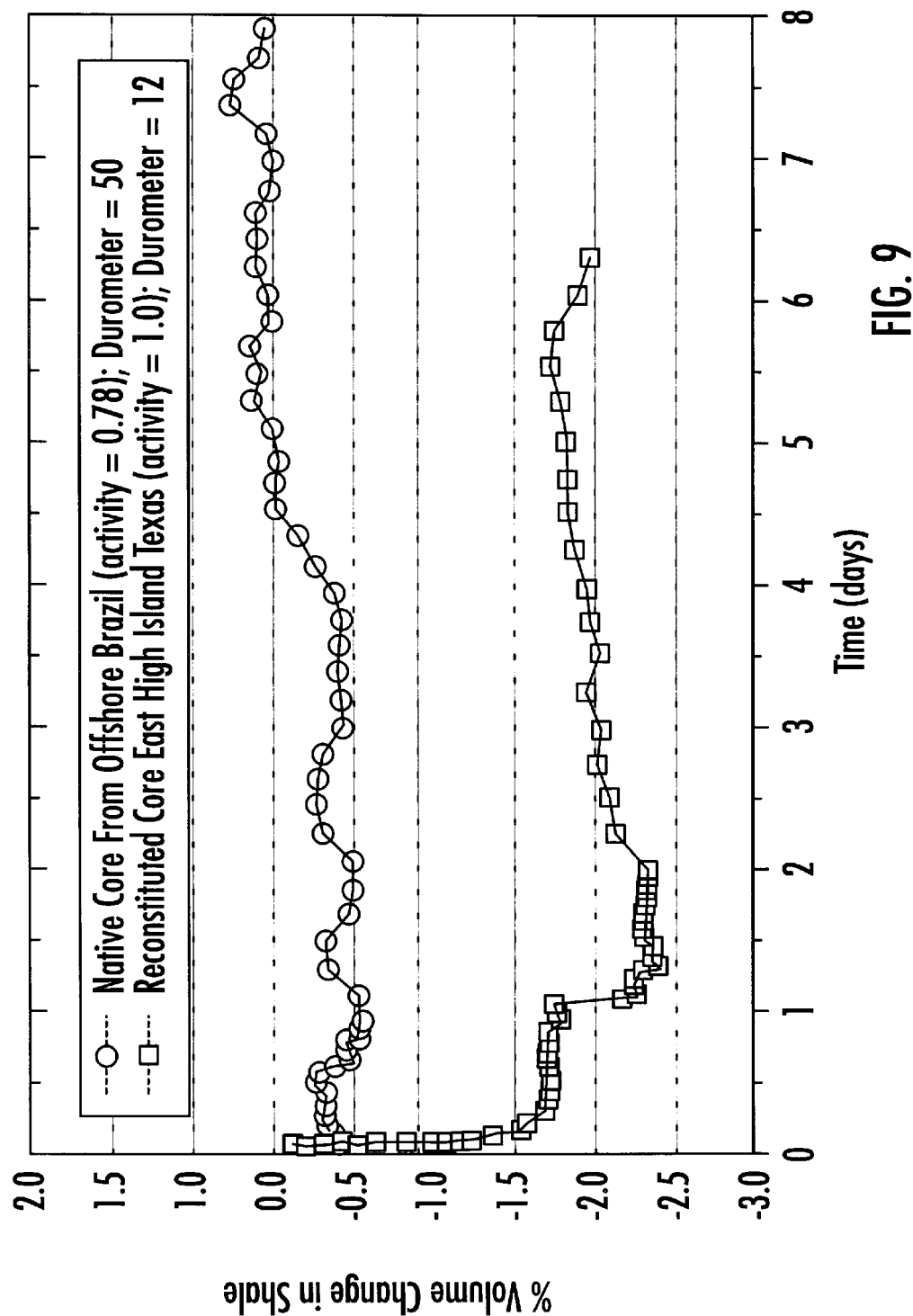
FIG. 9 illustrates graphically the effect of various solutes on membrane efficiency.

FIG. 9 presents Linear Swellmeter data collected for a native shale core taken from a well drilled offshore Brazil, South America. The Brazil core was composed of 21% calcite, 30% smectite clay, and 28% illite clay. It had an initial Type A durometer reading of 50, and an initial water activity of 0.78. It was observed that some dehydration did occur for the shale core. The shale volume dropped to a negative 0.5% during the test. The initial low activity of the core and it initial hardness probably prevented a larger volume decrease in the Linear Swellmeter tests.

EXAMPLE 5

Figure 10:
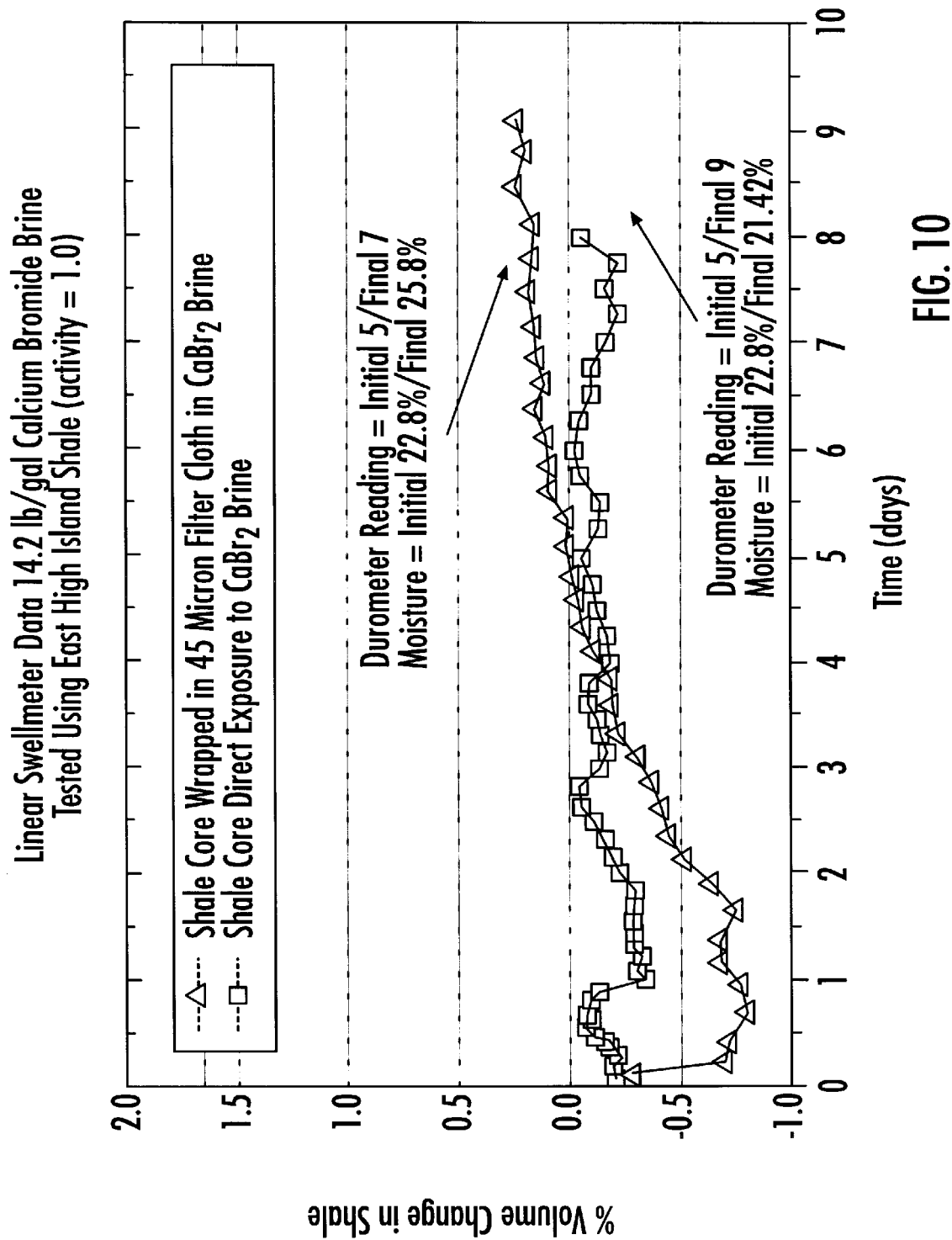
FIG. 10 illustrates graphically the change in shale volume versus time, comparing various solute molecules.

Referring now to FIG. 10, a comparison is plotted using 14.2 lbs/gal calcium bromide brine ($CaBr_2$) to reduce the activity, versus using the same salt coupled with the use of a 0.45 micron filter cloth. During the first four days of the test, the 0.45 micron filter cloth simulated an improved membrane efficiency, causing a larger decrease in shale volume than that caused solely by exposure to the calcium chloride brine, thus clearly demonstrating that when the membrane efficiency is improved, i.e., the effective pore space of the shale is made smaller, or is partially restricted, the shale will tend to give off water, rather than take it in. After about four days, steady state conditions apparently ensued, perhaps brought about by an ion exchange, causing the two data curves to merge and then diverge in different directions.

EXAMPLE 6

Figure 11:
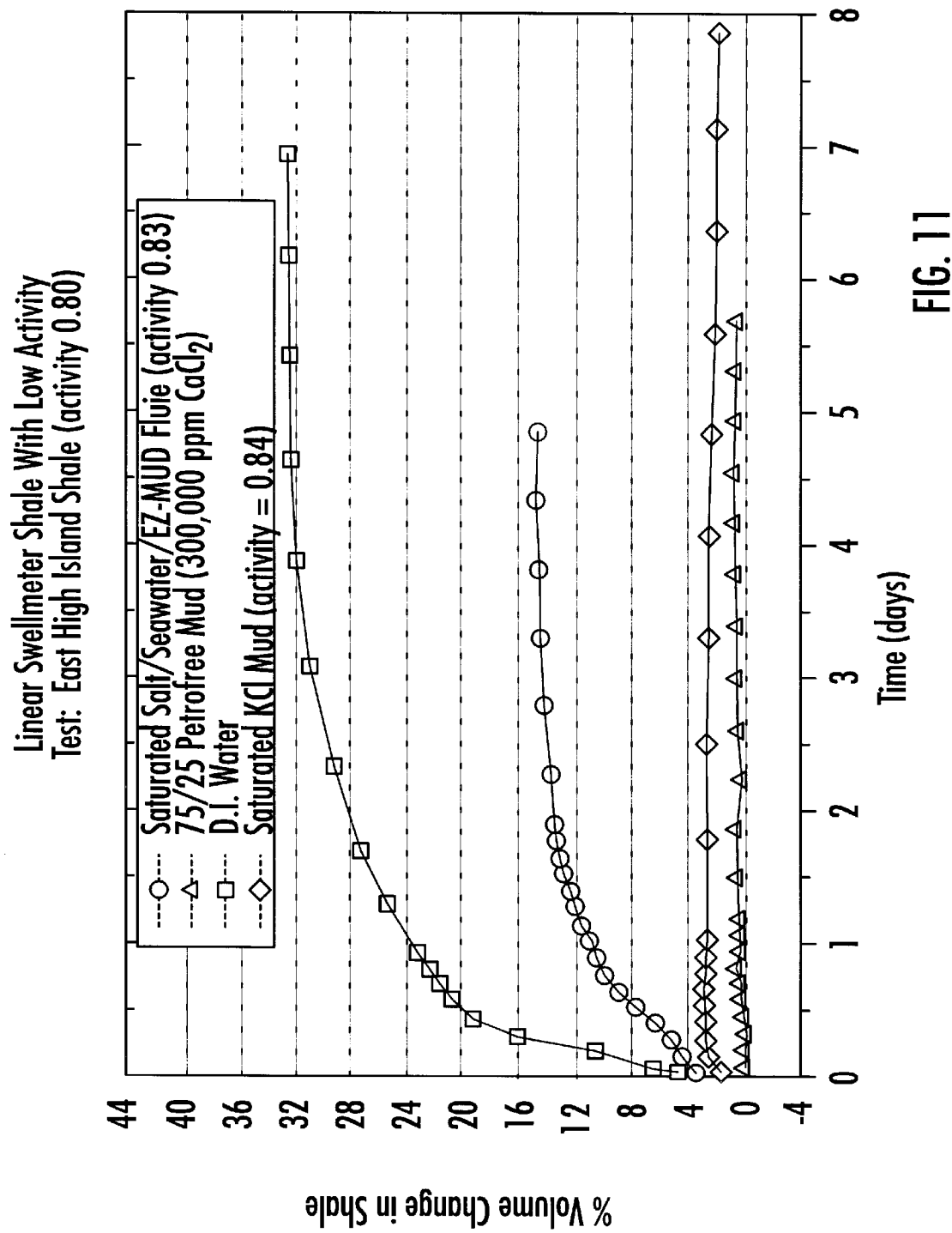
FIG. 11 illustrates graphically the change in shale volume versus time, comparing various solute molecules.

Referring now to FIG. 11, a comparison is plotted using various drilling fluids to monitor change in shale volume versus time. The 75/25 PETROFREE (ester) mud having 300,000 ppm $CaCl_2$ showed the least amount of positive volumetric change in core volume, i.e., the core took in less water when exposed to the 75/25 PETROFREE drilling fluid.

EXAMPLE 7

Figure 12:
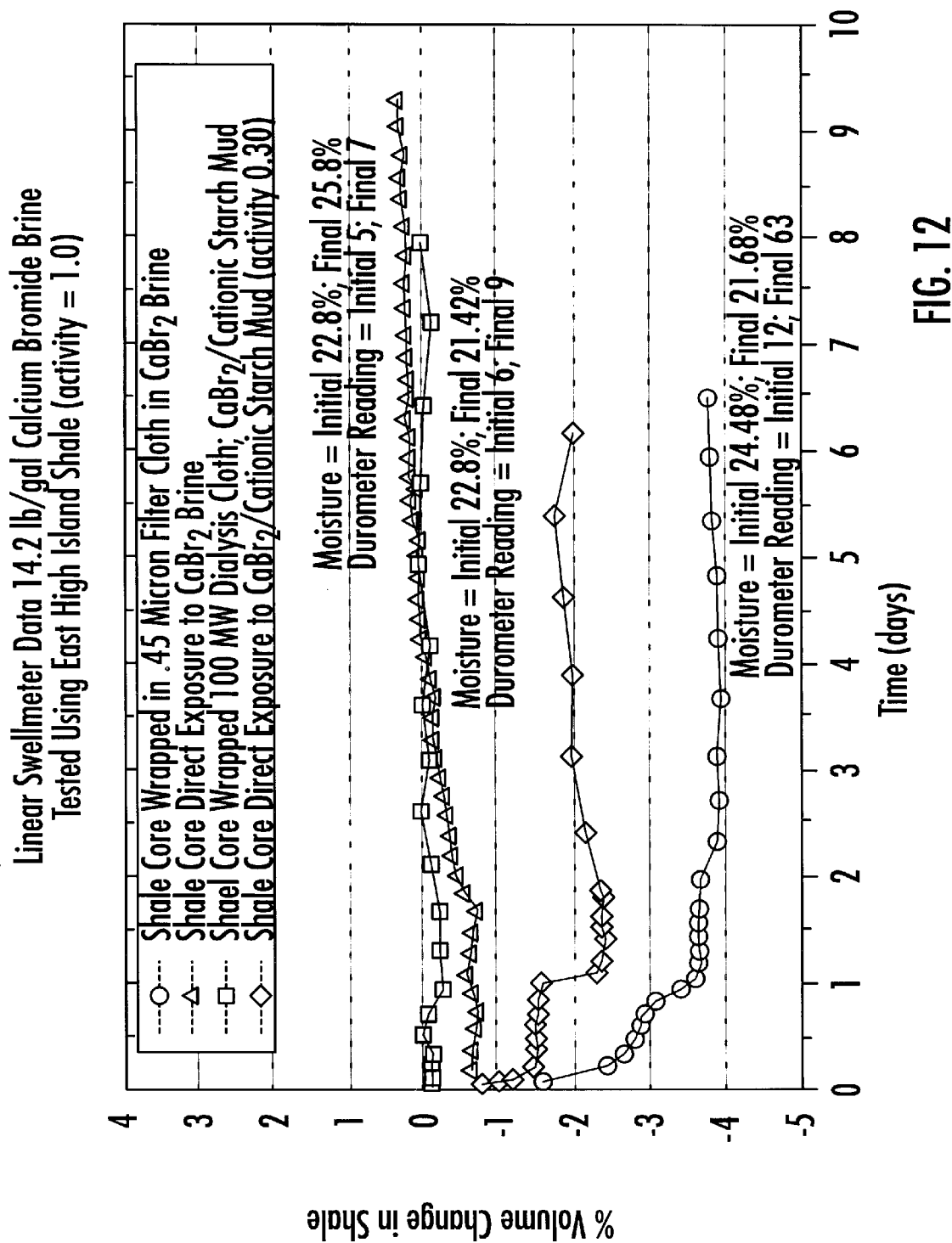
FIG. 12 illustrates graphically the change in shale volume versus time, comparing various solute molecules.

Referring now to FIG. 12, a drilling fluid containing 14.2 lbs/gal Calcium Bromide brine ($CaBr_2$) was tested with various filter cloths, and with or without a starch to improve the membrane efficiency. The $CaBr_2$ drove the activity of the drilling fluid water way down (0.3), coupled with the use of the starch to improve the membrane efficiency, resulting in a net fluid loss out of the shale core of about 4%, by volume, a highly desirable result for stabilizing shale formations. The shale core wrapped in 100 MW dialysis cloth, simulated a shale with smaller pore radii—representing downhole conditions. This improved the membrane efficiency σ as a result of smaller pore radii. Higher σ in combination with lower activity, i.e., higher Δπ resulted in dehydrating the shale and hence a net reduction in volume of about 4%.

In summary, the laboratory tests confirmed that the improvement of the membrane efficiency, coupled with a decreased activity of the water-based drilling fluid relative to the water phase activity of the shale, will broadly enhance wellbore stability while drilling in shale formations. This combination is thus utilized to control the flow of solution, solvent and solute into or out of the formation.

Moreover, the invention is not limited to stabilizing the clay formations while drilling. The combination of improving the membrane efficiency, coupled with a decreased water activity, will improve the lubricity by reducing the coefficient of friction between the tubular and the formation (osmotic forces create a lubricating film between the tubular and the formation). With such a combination, the drillstring is less likely to become stuck in the borehole due to differential sticking.

Moreover, the present invention will increase the strength of a shale formation by altering the water content, chemistry and ion composition of the shale by causing the water contained in the shale to flow into the borehole, in lieu of the water contained in the WBM flowing into the shale.

Finally, the present invention can be used to control the flow of water in offshore, deep water formations by altering the chemical, electrical and thermal properties of the water-based drilling fluids with which these formations are drilled.

In practicing the invention, any number of solute molecules, or combination of different solute molecules (inorganic, organic, polymer, etc.) having a solute size (hydrated or unhydrated) greater than the radius of the water molecule and being of an appropriate size compared to the average shale pore radii, can be used to impart a higher membrane efficiency to a water-based drilling fluid used in drilling shale formations.

The invention also contemplates the use of two or more different solute molecules, having different radii, to assist each other in filling or partially filling the pores in the shale membrane. As a general guideline for choosing the particular solute molecules to be added to the drilling fluid, the higher molecular weight solutes have larger radii, and lower molecular weight solutes have lower activity. Although blocking of a pore space is believed to be more efficient when the solute has totally entered into the pore spacing, i.e., the solute radius is less than the pore radius, some packing of the pore space occurs when the solute radius is slightly larger than the pore space, not unlike a two inch diameter bell being partially lodged in a hole of 1½" diameter.

As examples of organic solute molecules, sugars and their derivatives, alcohols and their derivatives, and starches and their derivatives can be used, to name but a few. Inorganic solute molecules which can be used include the salts such as $(Al)_2SO_4$, $MgCl_2$, $NH_4Cl$, $Cr_2(SO_4)_3$, $CuSO_4$, $Zn(SO_4)$, $Ni(SO_4)$, $MnSO_4AlCL_3$, $CdSO_4$, $CrCL_3$, and $Cr(NO_3)_3$.

As another mechanism for improving the membrane efficiency, the invention contemplates the use of any solute molecule or combination of solute molecules (inorganic, organic, polymer, etc.) that has a solute size which is less than the average pore size (radii) of the shale, that can enter the shale pore throat and embed itself either by mechanical (pressure), electrical, or chemical driving force, and can restrict or reduce the native pore size by attaching itself to the walls of the pore by either mechanical, chemical, or electrical means. This will improve the overall membrane efficiencies of the shale by reducing or restricting the native pore size. These restrictions may not always be of a physical (mechanical) nature but it could be either electrical, chemical or thermal in nature. These restrictions or reduction in pore size can also be achieved by increasing the filtrate viscosity of the fluid either by chemical, thermal or any other means. Similar objectives (reduced shale pore size) can also be achieved by partially or completely collapsing the pores either through mechanical, chemical, thermal or electrical means. The end effect of this will result in an increase in the membrane efficiency of the shales. Physical, chemical, electrical or thermal coating of the shale surface (borehole wall) with a material and or an imposed chemical, electrical, or thermal field to restrict the openings of the shale pore throat to create a permeability selective membrane (e.g., coating the borehole wall with a membrane cloth, liquid, gel, etc.) to restrict the pore opening are additional systems with which to increase the membrane efficiency in accord with the present invention.

To increase the viscosity of the fluid contained within the shale, an emulsion of micro oil droplets in a water-based drilling fluid can be used to enter the shale pores and create a high viscosity barrier to reduce penetration of the drilling fluid water into the shale.

All of the above described systems, either alone or in various combinations, can be used to increase the shale membrane efficiency.

In addition to increasing the membrane efficiency, the invention contemplates the use of drilling fluid additives which will decrease the activity of the drilling fluid relative to the water phase activity of the shale, thereby increasing the osmotic pressure associated with such water-based drilling fluid. The decrease in activity of the drilling fluid water (increase in osmotic pressure) can be achieved by adding solutes of traditional salts, for example, sodium chloride, calcium chloride and potassium chloride, but also solutes of $(Al)SO_4$, $MgCl_2$, $NH_4Cl$, $Cr_2(SO_4)_3$, $CuSO_4$, $Zn(SO_4)$, $Ni(SO_4)$, $Mn(SO_4)$, $AlCl_3$, $CdSO_4$, $CrCl_3$, $Cr(NO_3)_3$, and $CaBr_2$. Zinc Bromide can also be used if toxicity is not a concern.

In matching up the particular molecular solutes to a given shale formation to improve the membrane efficiency, the preferred embodiments of the invention contemplates the determination of the average pore size of the shale. This can be done through core samples, drill cuttings, or through logs conducted either in the well of interest or in offset wells in that same area. In doing core analysis, the wellknown mercury injection techniques can be used to determine pore radius, to name but one example. The cation exchange capacity (CEC) can also be used, in correlation with a measurement of the total surface area of the shale sample or core, there being a general feeling that pore radii are correlated quite well with those two parameters. Once the average shale pore radius is determined, then molecular solutes can be chosen having average pore radii optimized to fit well within Equation 4, usually smaller than the average pore radii of the shale, but large enough, either alone or in combination with other molecular solutes, to at least partially block or restrict such shale pores. Comparing the molecular weight of a given solute with its molecular diameter, provides the following values:

| Molecular Weight | Molecular Diameter (Angstroms) |
| --- | --- |
| 10 | 2.9 |
| 100 | 6.2 |
| 1,000 | 13.2 |
| 10,000 | 28.5 |
| 1,000,000 | 132.0, | where one (1) Angstrom is equal to 1/10,000 micron.

It should be appreciated that the activity of a given solute molecule is in the vast majority of cases directly proportional to the radius of the molecule, i.e., the larger the molecule, the greater the activity. Thus, for any given task of choosing a particular solute to at least partially block a given shale pore size, the activity increases as the solute size increases, thus involving a self-defeating mechanism, one in which the activity increases and in which instance, the desired clay stabilization is not achieved. Thus, although one could practice the invention using the same solute to both increase the membrane efficiency and to decrease the activity, the preferred embodiment of the present invention contemplates using one or more given solute molecules (e.g., organic, inorganic, polymer) for improving the membrane efficiency and one or more different solute molecules (e.g., organic, inorganic, polymer) for decreasing the water activity of the drilling fluid.

Coupled with improvements in the shale membrane efficiency, solutes are chosen to reduce the activity of the water-based drilling fluid, preferably down to about 0.3. In combination, the improved membrane efficiency and reduced activity provide water-based drilling fluids providing vastly enhanced stabilization of drilled shale formations.

Although the present invention has been described herein as relating to shale stabilization, "shale" should be construed in its broadest sense, including but not being limited to shaly sand, mud stone, clay stone, clay, etc.

The invention also contemplates utility in applications other than the drilling of oil and gas wells. For example, a water-based spotting fluid for freeing stuck pipe can be formulated by the use of a first additive of dissolved solute molecules sized to increase the efficiency of the shale membrane adjacent stuck pipe in the borehole and a second additive of dissolved solute molecules selected for decreasing the activity of the water in the spotting fluid.

In addition, the invention contemplates the formulation of a treating fluid for use in boreholes through shale formations. Through the use of such first and second additives as discussed with respect to formulating a spotting fluid, together causing dehydration of the shale, i.e., water leaves the shale to enter the borehole, thus resulting in a strengthening (hardening) of the shale. By strengthening the shale formation, various good benefits are achieved, for example, as when offshore construction pilings are placed in such boreholes.

Moreover, the combination of the first and second additives as discussed with respect to formulating a spotting fluid, creates a completion fluid which can be used when perforating into shale formations. Especially useful in open hole (non-cased), formulated completion fluid will cause the shale formation to strengthen and provide an improved completion job.

In addition, the combination of such first and second additives as discussed with respect to formulating a spotting fluid, can be used as a lubricant for the drill string in shale formations, since the dehydrated shales will be less likely to differentially stick against the tubular drill string.

Although examples have been provided herein of various additives for addressing membrane efficiency and the activity of water in the fluid, the invention is not intended to be limited to the listed examples. In addition to the listed salts, the activity of the fluid can also be reduced by the addition of inorganic solutes of certain polymers. A wide range of inorganic solutes, e.g., alcohol and their derivatives, glycols, sugars, and their derivatives, starches and their derivatives, will also reduce water activity. The invention also contemplates various combinations of organic, inorganic and polymeric solute molecules be used to perform one or both of the two desired functions, viz., increasing the membrane efficiency and decreasing the water activity. For example, a combination of different salts in combination with an alcohol and/or their derivatives, or glycols or starches, will produce results contemplated by the invention.

Thus, the invention is intended to be interpreted in its broad sense, and is intended to be limited only by the scope of its appended claims.

References

1. Mody, F. K. and Hale, A. H.: "A Borehole Stability Model to Couple the Mechanics and Chemistry of Drilling Fluid/Shale Interaction," paper IADC/SPE 25728 presented at the IADC/SPE Drilling Conference, Amsterdam, February 23–25, (1993).
2. van Oort, E., Hale, A. H., Mody, F. K., and Roy, S.: "Critical Parameters in Modelling The Chemical Aspects of Borehole Stability in Shales and in Designing Improved Water-Based Shale Drilling Fluids," paper SPE 28309 presented at the 69th Annual Technical Conference and Exhibition of SPE, New Orleans, La., September 25–28, (1994).
3. Hale, A. H. and Mody, F. K., and Salisbury, D. F.: "Experimental Investigation of the Influence of Chemical Potential on Wellbore Stability," paper IADC/SPE 23885 presented at the IADC/SPE Drilling Conference, New Orleans, La., February 18–21 (1992).
4. Bol, G. M., Wong, S. W., Davidson, C. J., and Woodland, D. C.: "Borehole Stability in Shales," paper SPE 24975 presented at the SPE European Petroleum Conference, Cannes, France, November 16–18 (1992).
5. Steiger, R. P. and Leung, P. K.: "Quantitative Determination of the Mechanical Properties of Shales," paper SPE 18024 presented at the 63rd Annual Technical Conference and Exhibition of SPE, Houston, Tex., October 2–5 (1988).
6. van Oort, E.: "A Novel Technique for the Investigation of Drilling Fluid Induced Borehole Instability in Shales," paper SPE/ISRM 28064 presented at the SPE/ISRM Conference, Delft, August 29–31, (1994).
7. Wong, S. W., and Heidug, W. K.: "Borehole Stability in Shales: A Constitutive Model for the Mechanical and Chemical Effects of Drilling Fluid Invasion," paper SPE/ISRM 28059 presented at the SPE/ISRM Conference, Delft, August 29–31, (1994).
8. Sherwood, J. D.,: "Biot Poroelasticity of a Chemically Active Shale," Proc. R. Soc. Lon. A. 440,365, (1993).
9. Simpson, J. P., Waker, T. O., and Jiang, G. Z.: "Environmentally Acceptable Water-Based can Prevent Shale Hydration and Maintain Borehole Stability," paper IADC/SPE 27496 presented at the IADC/SPE Conference, Dallas, Tex., February 16–18, (1994).
10. Colback, P. S. B. and Wiid, B. L.: "The Influence of Moisture Content On the Comprehensive Strength of Rocks," Proc. Rock Mech. Symp., Can. Dept. Mines Tech. Surv., Toronto, Canada, January, pp. 65–83, (1965).
11. Parker, J.: "Temperature and Humidity Affects Strength of Rock Structures at White Pine," Trans. Am. Inst. Min., Metall., Pet. Eng., v. 247, pp 142–144, (1970).
12. Wiid, B. L.: "The Influence of Moisture on the Pre-Rapture Fracturing of Two Rock Types," Proc. 2nd Int. Conf. Rock Mech., Belgrade, Yugoslavia, September 21–26, vol. 2, pp 239–245, (1970).
13. Griffith, A. A.: "The Phenomena of Rapture and Flow in Solids," R. Soc.
London Phil. Trans., v.221, pp 163–198, (1920).
14. Wawerski, W. R.: "Detailed Analysis of Rock Failure in Laboratory Compression Test," Ph.D. Thesis, Univ. Minnesota, Minneapolis, 165 pp, (1968).
15. Peng, S. and Johnson, A. M.: "Crack Growth and Fracturing in Cylindrical Specimens of Chelmsford Granite," Int. J. Rock Mech. Min. Sci., v. 9, pp 37–86, (1972).
16. Brace, W. F. and Martin, R. J.: "A Test of the Law of Effective stress for Crystalline Rocks of Low Porosity," Int. J. Rock Mech. Min. Sci.,m v. 5, pp 415–426, (1968).
17. Swan, G., Cook, J., Bruce, S., and Meehan, R.: "Strain Rate Effects on Kimmeridge Bay Shale," Int. J. Rock Mech. Min. Sci., v. 26, pp 139–149, (1989).
18. Cook, J., Sheppard, M. C. and Houwen, 0. H.: "Effects of Strain Rate and Confining Pressure on the Deformation and Failure of Shales," paper IADC/SPE 19944, presented at the 1990 TADC/SPE Conference, Houston, Tex., March, (1990).

19. Wash, J. B.: "The Effect of Cracks on the Uniaxial Compression of Rocks," J. Geophys. Res., v. 70, pp 399–411, (1965).
20. Marayama, S.: "Swelling of Mudstone due to Sucking of Water," Proc. First Int. Congr. Rock Mech., Losbon, Portugal, September 25–October 1, v. 1, pp 495–498, (1966).
21. Chenevert, M. E.: "Adsorptive Pore Pressure of Argillaceous Rocks, in Rock Mechanics Theory and Practice (W. H. Somerton, Ed.), Eleventh Symp. Rock Mech., Am. inst. Min., Metall., Pet. Eng., pp 599–627, (1970).
22. Low, P. F. and Deming, J. M.: "Movement and Equilibrium of Water in Heterogeneous Systems with Special reference to Soils," Soil Sci., v.71, pp 409–418, (1953).
23. Wang, J. H.: "Effects of ions on the Self-Diffusion and Structure of Water in Aqueous Electrolytic Solutions," J. Phys. Chem., v.58, pp 686–692, (1954).
24. Wang, J. H., Robinson, C. V., and Edelman, I. S.: "Self-Diffusion and Structure of Liquid Water: III. Measurement of Self-Diffusion of Liquid Water with $H^2$, H3, and $O^{18}$ as Tracers," J. Am. Chem. Soc. 75: pp 466–470, (1952).
25. Kemper, W. D.: "Movement of Water as Effected by Free Energy And Pressure Gradients: I. Application of Classical Equations for Viscous and Diffusive Movements to the Liquid Phase in Finely Porous Media," Proc. Soil Sci. Soc. Am., v.25, pp 255–260, (1961).
26. Kemper, W. D.: "Movement of Water as Effected by Free Energy And Pressure Gradients: II. Experimental Analysis of Porous Systems in Which Free Energy and Pressure Gradients Act in Opposite Direction," Proc. Soil Sci. Soc. Am., v.25, pp 260–265, (1961).
27. Kemper, W. D. and Evans, N. A.: "Movement of Water as Effected by Free Energy And Pressure Gradients: III. Restriction of Solute by Membranes," Proc. Soil Sci. Soc. Am., v.27, pp 485–490, (1963).
28. Staverman, A. J.: "The Theory of Measurement of Osmotic Pressures," Recueil des Travaux Chimiques des Pays-Bas, v.70, pp 344–352, (1951).
29. Durbin, R. P.: "Osmotic Flow of Water Across Permeable Cellulose Membranes," J. Gen. Physiol. v.44, pp 315–326, (1960).
30. Reid, P. I., Elliot, G. P., Milton, R. C., Chambers, B. D. and Burt, D. A.: "Reduced Environmental Impact and Improved Drilling Performance with Water-Based Muds Containing Glycol," paper SPE 25989 presented at the SPE/EPA Exploration and Production Environment Conference, San Antonio, March 7–10, (1993).
31. Downs, J. D., van Oort, E., Redman, D., Ripley, D. and Rothmann, B.: "TAME—A New Concept in Water-Based Drilling Fluids for Shales," paper SPE 26699 presented at Offshore Europe (Europec), Aberdeen, September 7–10, (1993).

Appendix

THEORY: Based upon thermodynamic methods and certain nonthermodynamic assumptions, the following equation was developed for the rate of water movement in heterogeneous systems[22].

$$v_x = -K_x\left[\overline{V_o}\frac{\partial p}{\partial x} + \frac{Rt\partial N_o}{N_o\partial x} + M_o g\frac{\partial h}{\partial x} - 2bE\frac{\partial E}{\partial x} + \frac{\partial \theta_o}{\partial x}\right]$$

In this equation, the "o" subscript refers to water in an infinitely dilute solution, the "x" subscript to the distance in the x-direction and the symbols are as follows:
v=velocity
K=transmission constant
$\overline{V}$=partial molar volume
p=pressure
R=molar gas constant
t=absolute temperature
N=mole fraction
M=molecular weight
g=acceleration due to gravity
h=height above datum
b=a constant
E=electrical field intensity
θ=adhesion potential This equation is valid for diffusion with the diffusional velocity measured relative to the dispersion medium. The dispersion medium for water is the dissolved solutes. Considering only horizontal diffusion in the x-direction and ignoring the effects of electrical and adhesion forces, the above equation reduces to $$v = -K\left[\overline{V_o}\frac{dp}{dx} + \frac{Rt dN_o}{N_o dx}\right]$$

However, $N_0 = 1 - \Sigma N_s$, where the subscript "s" refers to any solute. Consequently, $$v = -K\left[\overline{V_o}\frac{dp}{dx} - \frac{Rt}{1-\Sigma N_s}\left\{\Sigma\frac{dN_s}{dx}\right\}\right]$$

Since in an infinitely dilute solution $$\Sigma N_s \ll 1$$
$$N_s = \frac{\eta_s}{\eta_o + \Sigma \eta_s} \approx \frac{\eta_s}{\eta_o} \text{ and}$$
$$V = \eta_o \overline{V_o} + \Sigma \eta_s \overline{V_s} \approx \eta_o \overline{V_o},$$

we have $$V = -K\overline{V_o}\left[\frac{dp}{dx} - Rt\Sigma\frac{dm_s}{dx}\right],$$

where η=number of moles, V=volume of solution, m=η/V= molar concentration. The osmotic pressure, π, for an infinitely dilute solution is related to the composition of the solution by the van't Hoff equation, π=RtΣm_s. As a result, $$v = -K\overline{V_o}\left[\frac{dp}{dx} - \frac{d\pi}{dx}\right].$$

The above equation (A3) was obtained by using the assumption that the solution is infinitely dilute and that no force field influence the water molecules. The same equation can be obtained without using these assumptions, provided the partial molar volume of water does not change appreciably with pressure or the composition of the solution. In this event, equation (A2) can be expressed in terms of total activity, "a"[23]. Thus $$v = -K\left[\overline{V}_o \frac{dp}{dx} + Rt\frac{d(\ln\overline{a}_o)}{dx}\right]$$

Since for concentrated solutions, $$\overline{V}_o \pi = -Rt\ln\overline{a}_o$$

we can write $$\overline{V}_o d\pi = -Rt d(\ln\overline{a}_o)$$

and $$v = -K\overline{V}_o\left[\frac{dp}{dx} - \frac{d\pi}{dx}\right]$$

Multiplying equation (A3) by A, the cross-section area of the diffusive path, we obtain the volume flow rate, denoted by Q:

$$Q = -KA\overline{V}_o\left[\frac{dp}{dx} - \frac{d\pi}{dx}\right]$$

Thus based upon thermodynamic principles, it is shown that the osmotic pressure acts as a negative hydraulic pressure in regulating the rate of water movement.

What is claimed is:

1. A method of increasing the matrix strength of a shale formation in an earth borehole subject to contact with a water-based borehole working fluid, comprising:

sampling said shale from said formation;

determining the average radii of the pores in said shale;

determining the water phase activity of said shale from said formation;

determining the water phase activity of said water-based working fluid;

selecting at least one first solute having a solute radius such that σ>0, where σ is defined as:

$$\sigma = \left[1 - \frac{(a-r_s)^2}{(a-r_w)^2}\right]$$

wherein:

a equals the pore radius of said shale, $r_s$ equals the solute radius, and $r_w$ equals the radius of a water molecule; and adding said at least one solute to said water based drilling fluid.

2. The method of claim 1, comprising:

adding to said water-based working fluid at least one second solute that decreases the water activity of said borehole fluid relative to the water activity of said shale from said formation.

3. The method claim 2 wherein said first and second solutes are chemically equivalent.

4. The method of claim 2 wherein said first and second solutes are chemically different.

5. The method of claim 1 wherein said sampling of said shale comprises obtaining a core sample from said formation.

6. The method of claim 1 wherein said sampling of said shale comprises utilizing drill cuttings from said formation.

7. The method of claim 1 wherein said sampling of said shale comprises logging said formation.

8. A method of formulating a water-based borehole working fluid to increase the matrix strength of a shale formation in an earth borehole subject to contact with said water-based borehole working fluid, comprising:

obtaining a sample of said shale from said formation;

determining the average radii of the pores in said shale;

determining the water phase activity of said shale from said formation;

determining the water phase activity of said water-based working fluid;

selecting at least one first solute having a solute such that σ>0, where σ is defined as:

$$\sigma = \left[1 - \frac{(a-r_s)^2}{(a-r_w)^2}\right]$$

wherein:

a equals the pore radius of said shale;

$r_s$ equals the solute radius; and $r_w$ equals the radius of a water molecule; and adding said first solute to said working fluid.

9. The method of claim 8, including adding to water-based working fluid at least one second solute that decreases the water activity of said borehole fluid relative to the water activity of said shale from said formation.

10. The method of claim 9 wherein said first and second solutes are chemically equivalent.

11. The method of claim 9 wherein said first and second solutes are chemically different.

12. The method of claim 8 where said sampling of said shale comprises obtaining a core sample from said formation.

13. The method of claim 8 wherein said sampling of said shale comprises utilizing drill cuttings from said formation.

14. The method of claim 8 wherein said sampling of said shale comprises logging said formation.

* * * * *

UNITED STATES PATENT AND TRADEMARK OFFICE
CERTIFICATE OF CORRECTION

PATENT NO.    : 5,925,598
DATED         : July 20, 1999
INVENTOR(S)   : Mody, et al It is certified that error appears in the above-identified patent and that said Letters Patent is hereby corrected as shown below:

On title page, item [73],

The name of the Assignee should read: "Baroid Technology, Inc."

Signed and Sealed this

Twenty-second Day of February, 2000

Attest:

Q. TODD DICKINSON

*Attesting Officer*                *Commissioner of Patents and Trademarks*